United States Patent
Geis

(10) Patent No.: US 6,683,389 B2
(45) Date of Patent: Jan. 27, 2004

(54) HYBRID ELECTRIC VEHICLE DC POWER GENERATION SYSTEM

(75) Inventor: Everett R. Geis, Orange, CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 0 days.

(21) Appl. No.: 09/938,101

(22) Filed: Aug. 23, 2001

(65) Prior Publication Data

US 2002/0070557 A1 Jun. 13, 2002

Related U.S. Application Data

(63) Continuation of application No. 09/609,099, filed on Jun. 30, 2000, now abandoned.

(51) Int. Cl.[7] ............................................. F02N 11/06
(52) U.S. Cl. ................................ 290/40 C; 180/65.2
(58) Field of Search ....................... 180/65.2; 322/16; 290/40 R

(56) References Cited

U.S. PATENT DOCUMENTS

| | | | | | |
|---|---|---|---|---|---|
| 5,568,023 A | * | 10/1996 | Grayer et al. | ................ | 180/165 |
| 5,698,905 A | * | 12/1997 | Ruthlein et al. | ........... | 180/65.4 |
| 5,806,617 A | * | 9/1998 | Yamaguchi | ................ | 180/65.2 |
| 5,848,659 A | * | 12/1998 | Karg et al. | ................. | 180/65.2 |
| 5,924,505 A | * | 7/1999 | Theurillat et al. | ......... | 180/65.4 |
| 5,965,991 A | * | 10/1999 | Koike et al. | ................ | 318/139 |
| 5,969,624 A | * | 10/1999 | Sakai et al. | ................. | 180/65.2 |
| 6,137,250 A | * | 10/2000 | Hirano et al. | .............. | 180/65.2 |
| 6,175,172 B1 | * | 1/2001 | Bakholdin et al. | ............ | 310/74 |
| 6,194,794 B1 | * | 2/2001 | Lampe et al. | .................. | 307/68 |
| 6,213,234 B1 | * | 4/2001 | Rosen et al. | ................ | 180/65.3 |
| 6,281,601 B1 | * | 8/2001 | Edelman et al. | ............... | 307/29 |
| 6,487,096 B1 | * | 11/2002 | Gilbreth et al. | ................ | 363/35 |

FOREIGN PATENT DOCUMENTS

JP            11098728 A   *   4/1999

* cited by examiner

Primary Examiner—Nestor Ramirez
Assistant Examiner—Julio Cesar Gonzalez
(74) Attorney, Agent, or Firm—Sterne, Kessler, Goldstein & Fox P.L.L.C.

(57) ABSTRACT

A hybrid electric vehicle, such as a bus or delivery vehicle, includes batteries and a turbogenerator/motor connected through a double conversion control system. The batteries and the turbogenerator/motor are each connected to a DC bus through bi-directional power converters operating as customized bi-directional switching converters configured, under the control of a power controller, to provide an interface between the DC bus and the batteries and turbogenerator/motor, respectively.

7 Claims, 10 Drawing Sheets

450

HYBRID ELECTRIC VEHICLE DC POWER GENERATION SYSTEM

This is a Continuation of application Ser. No. 09/609,099 filed Jun. 30, 2000 now abandoned.

TECHNICAL FIELD

This invention relates to the general field of power generation systems, and more particularly to an improved power generation system for a hybrid electric vehicle (HEV).

BACKGROUND OF THE INVENTION

Electric vehicles powered by storage batteries are subject to inconvenient energy replacement procedures. One of two procedures are currently used; either replacing the discharged battery with a fully charged battery or connecting a source of charging power to the vehicle and allowing the vehicle to sit, out of service, while the charging process is completed. Another operational disadvantage of a conventional battery powered electric vehicle is its inherent range limitation.

The hybrid electric vehicle is an attempt to overcome the above limitations. The usual way to form a hybrid electric has been to add an engine-generator to the electric vehicle for the purpose of battery charging while the vehicle is in operation. The conventional engine-generator has been of the reciprocating internal combustion configuration and the engine fuels have included diesel, LNG, CNG, propane, among others.

While the addition of a conventional internal combustion engine does solve the problems of charging and range, it introduced several significant disadvantages, including the vibration and noise caused by the reciprocating engine. More significantly, however, was the disadvantage of the air pollution caused by the burning of the hydrocarbon fuels in the reciprocating engine. The combined effects of noise, vibration, and air pollution renders the hybrid electric vehicle with a reciprocating engine less than ideal.

In addition, the output or bus voltage of the reciprocating internal combustion engine generator varies with the speed of the engine. This requires that the engine speed must be closely regulated to control the output or bus voltage with the consequence that the engine cannot be run too low in speed else the bus voltage would not be high enough to generate some of the voltages that are required. Contemporary HEV systems utilize battery voltages ranging from 250 V to 600 V, making it difficult to match the engine to the vehicle battery voltage. As a result, the engine needs to be run at higher speeds and lower temperatures, making it less efficient.

What is needed is an electric vehicle power system that overcomes the limitations described above.

SUMMARY OF THE INVENTION

The invention is directed to a hybrid electric vehicle, such as a bus or delivery vehicle, which includes batteries and a turbogenerator/motor connected through a bi-directional double conversion control system. The batteries and the turbogenerator/motor are each connected to a DC bus through bi-directional power converters operating as customized bi-directional switching converters configured, under the control of a power controller, to provide an interface between the DC bus and the batteries and turbogenerator/motor, respectively. In this manner a wide range of HEV battery voltages can be accommodated and also permits the HEV battery voltages to be used for starting the turbogenerator/motor.

BRIEF DESCRIPTION OF THE DRAWINGS

Figure 1:
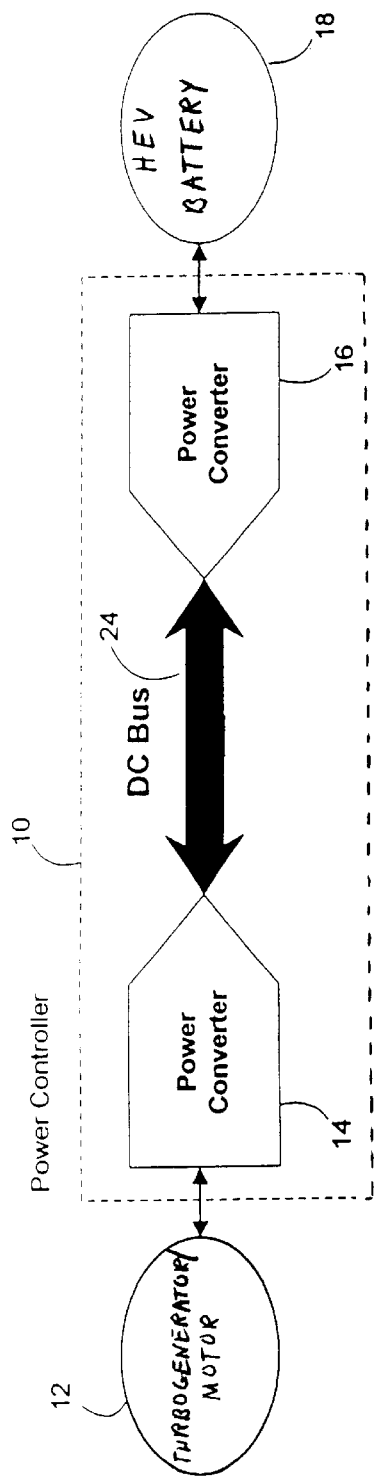
Figure 2:
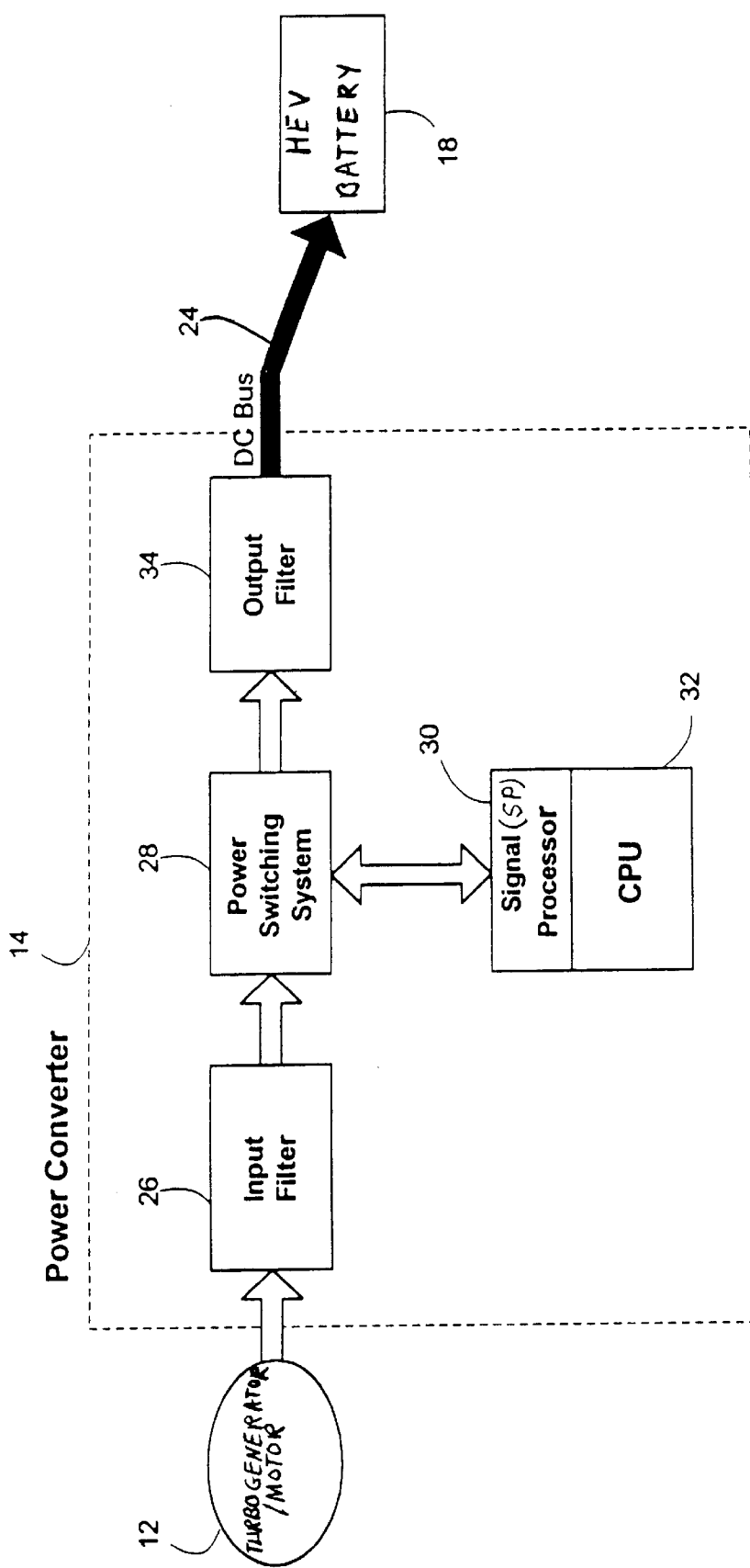
Figure 3:
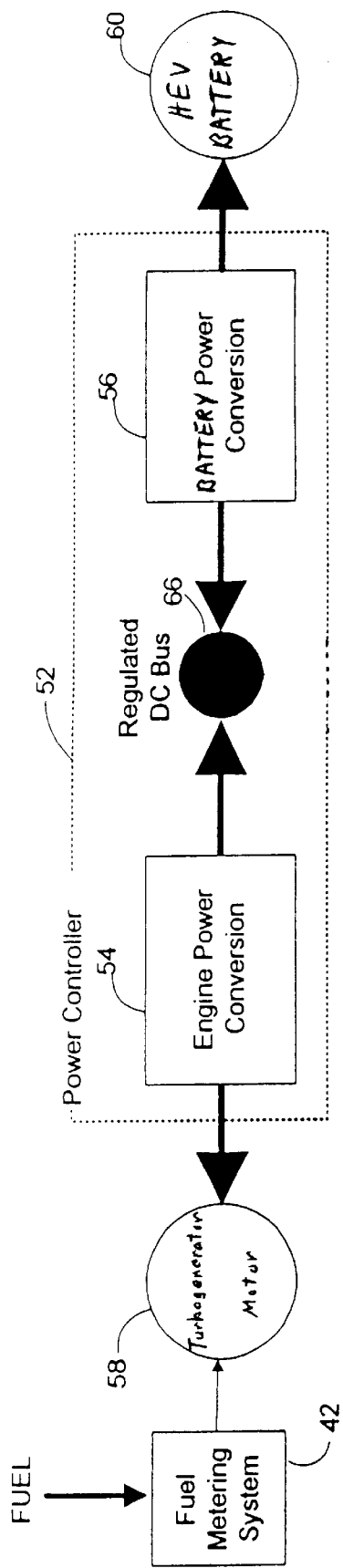
Figure 4:
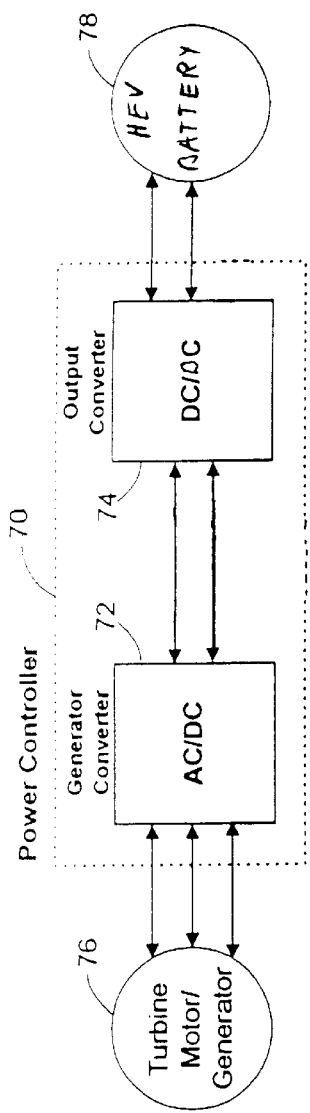
Figure 5:
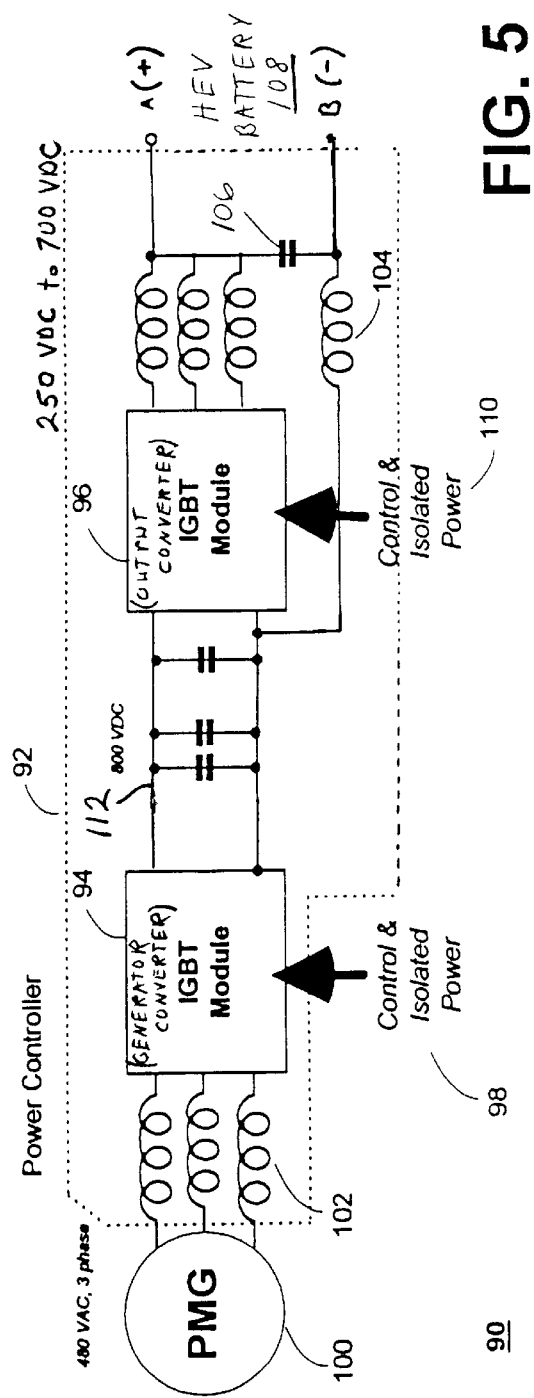
Figure 6:
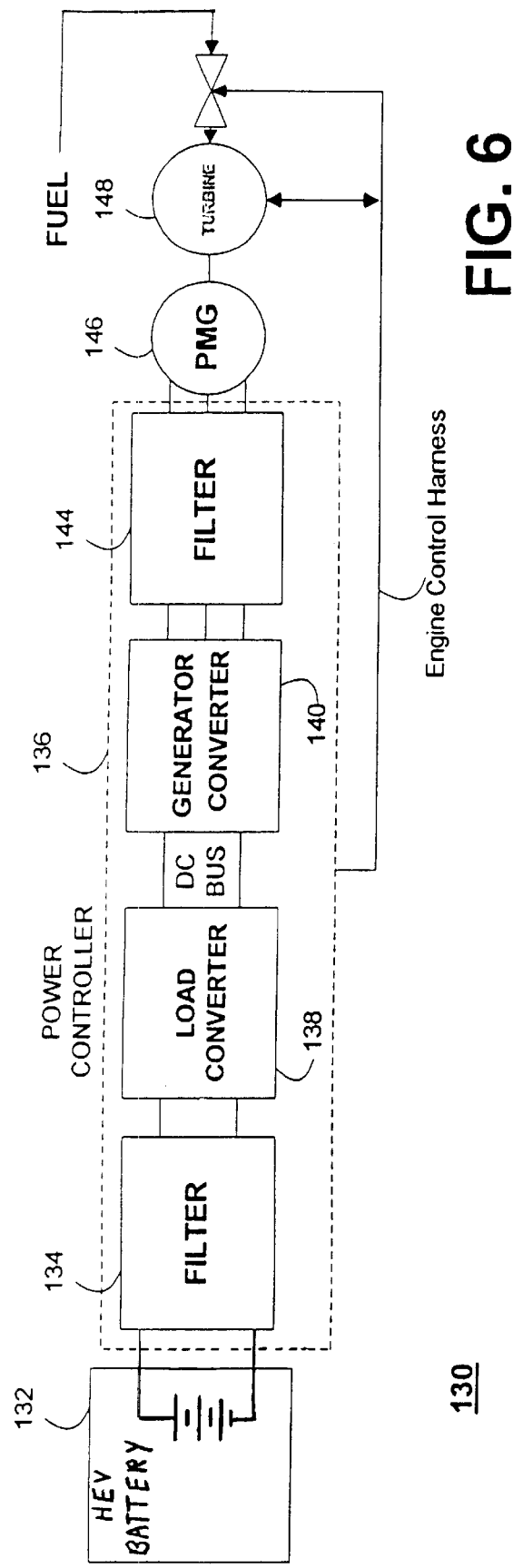
Figure 7:
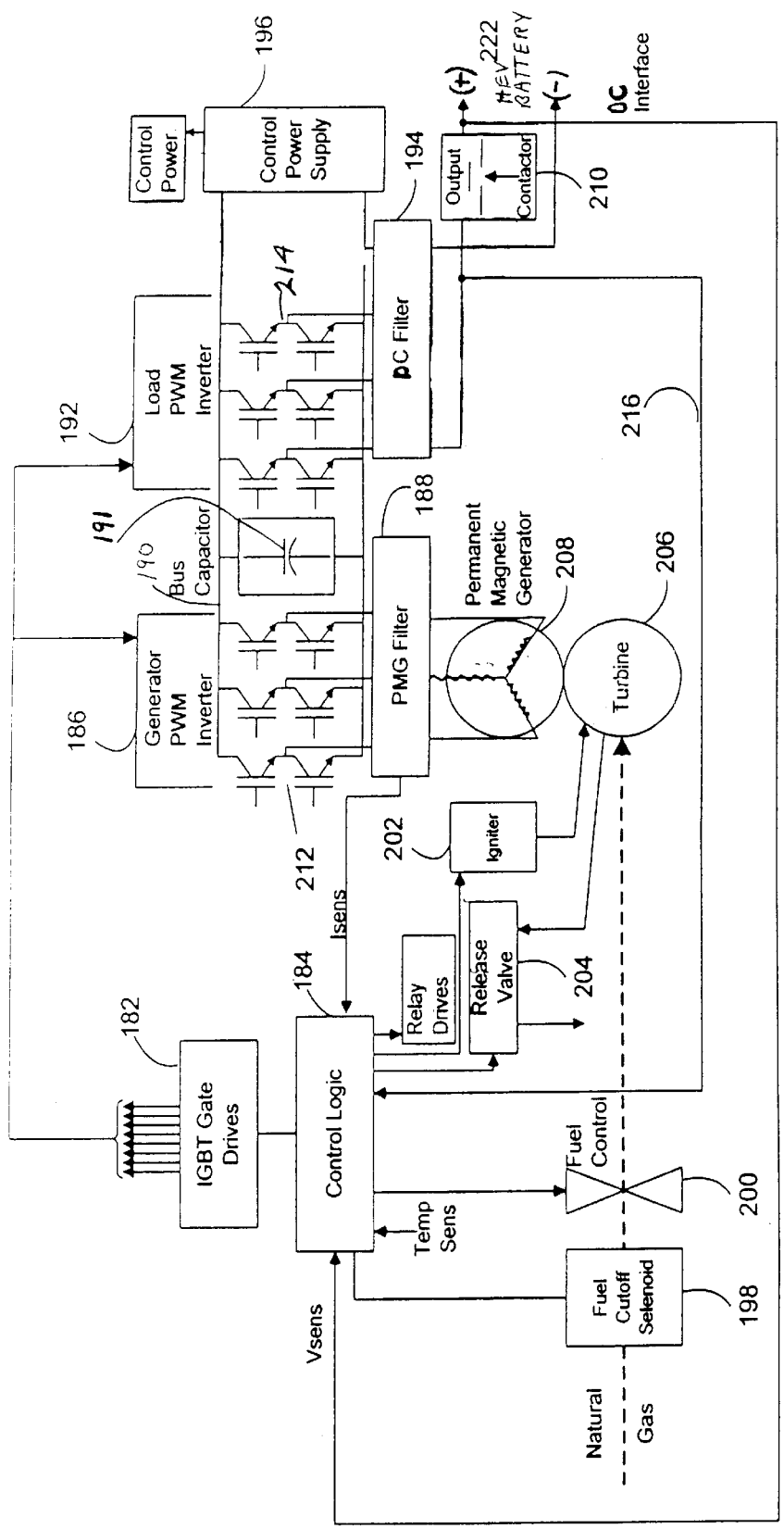
Figure 8:
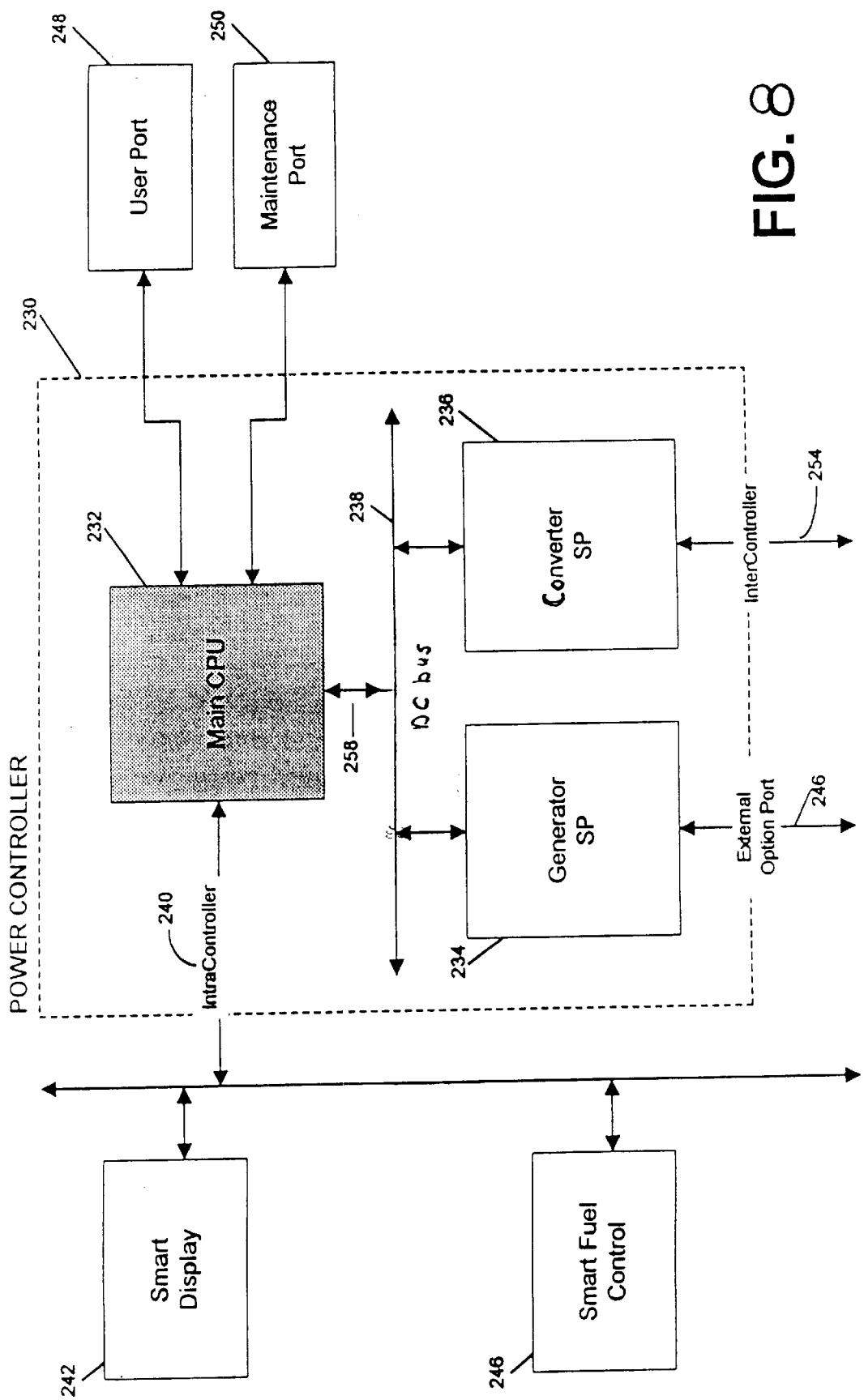
Figure 9:
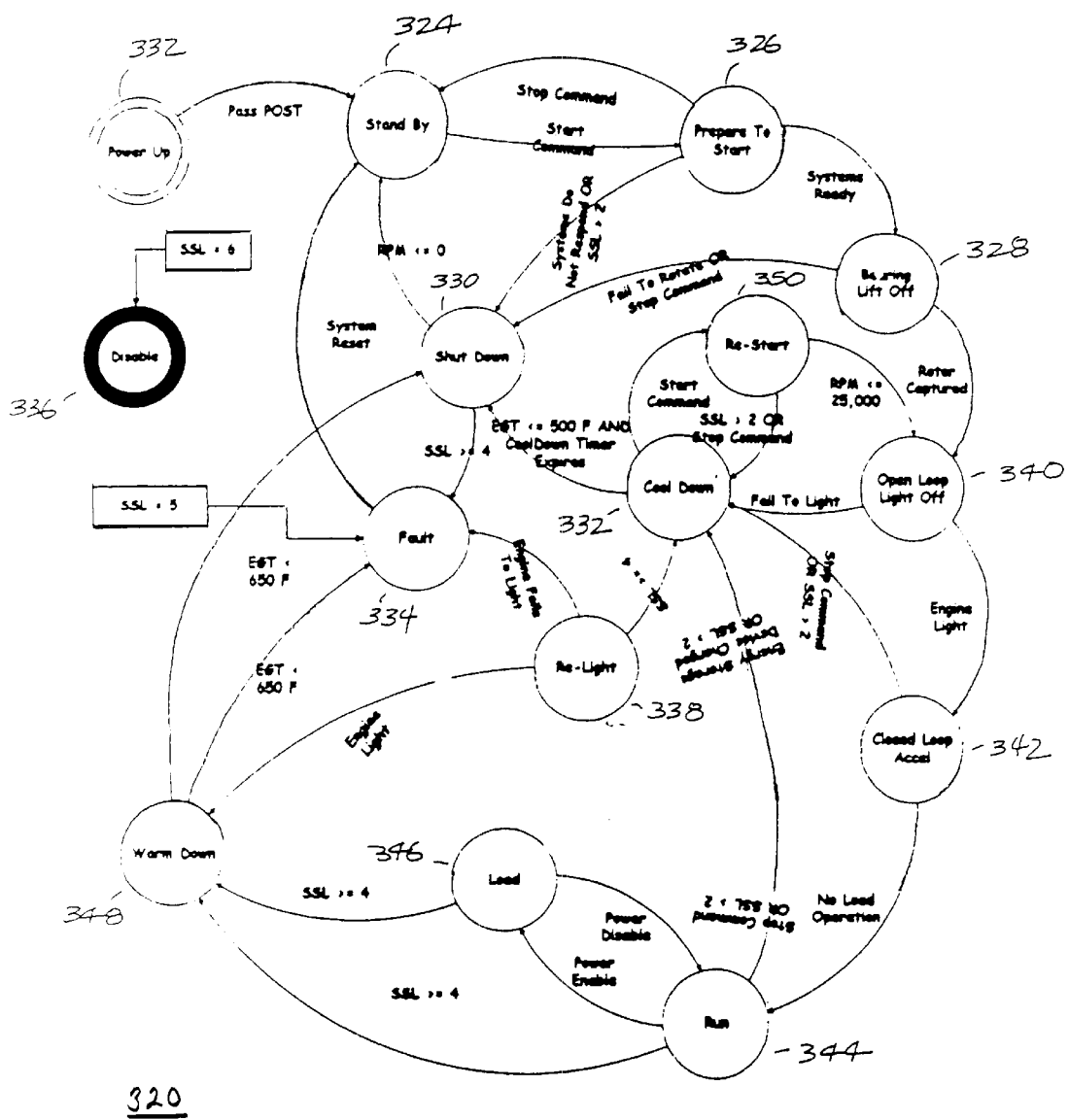
Figure 10:
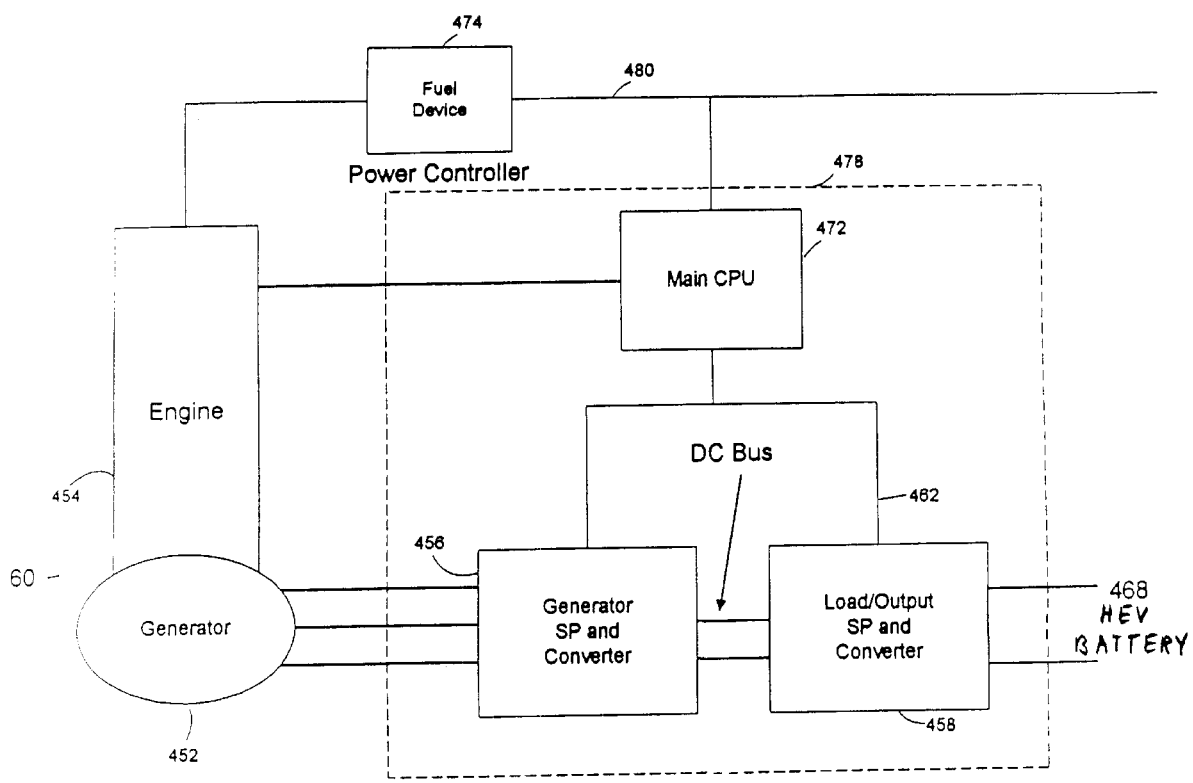
Figure 11:
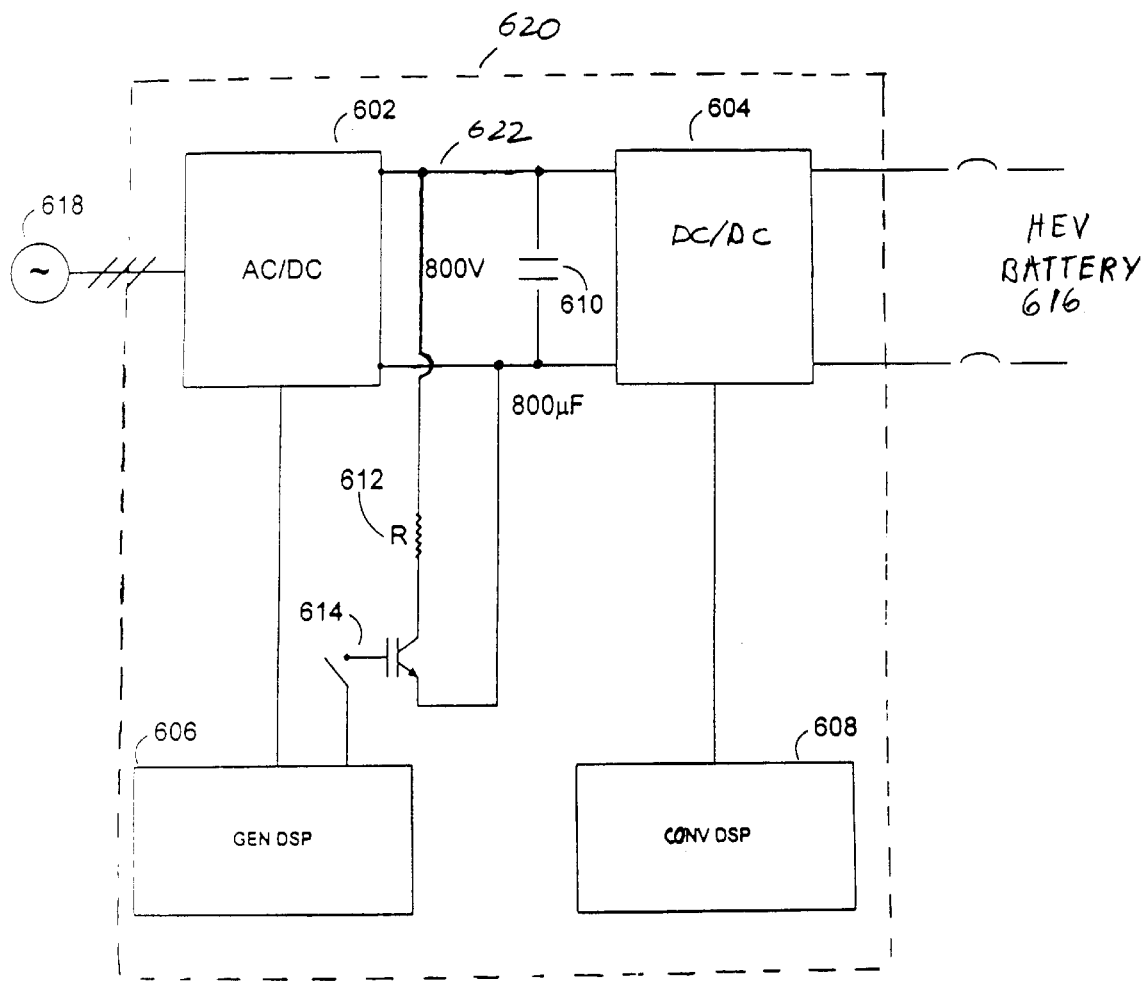
Figure 1:
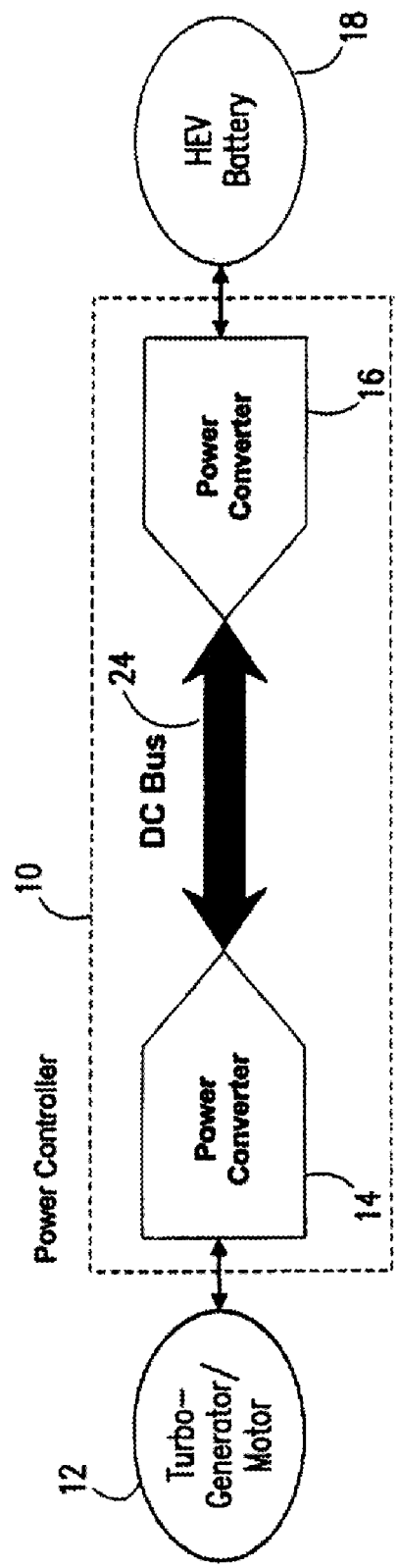
Figure 2:
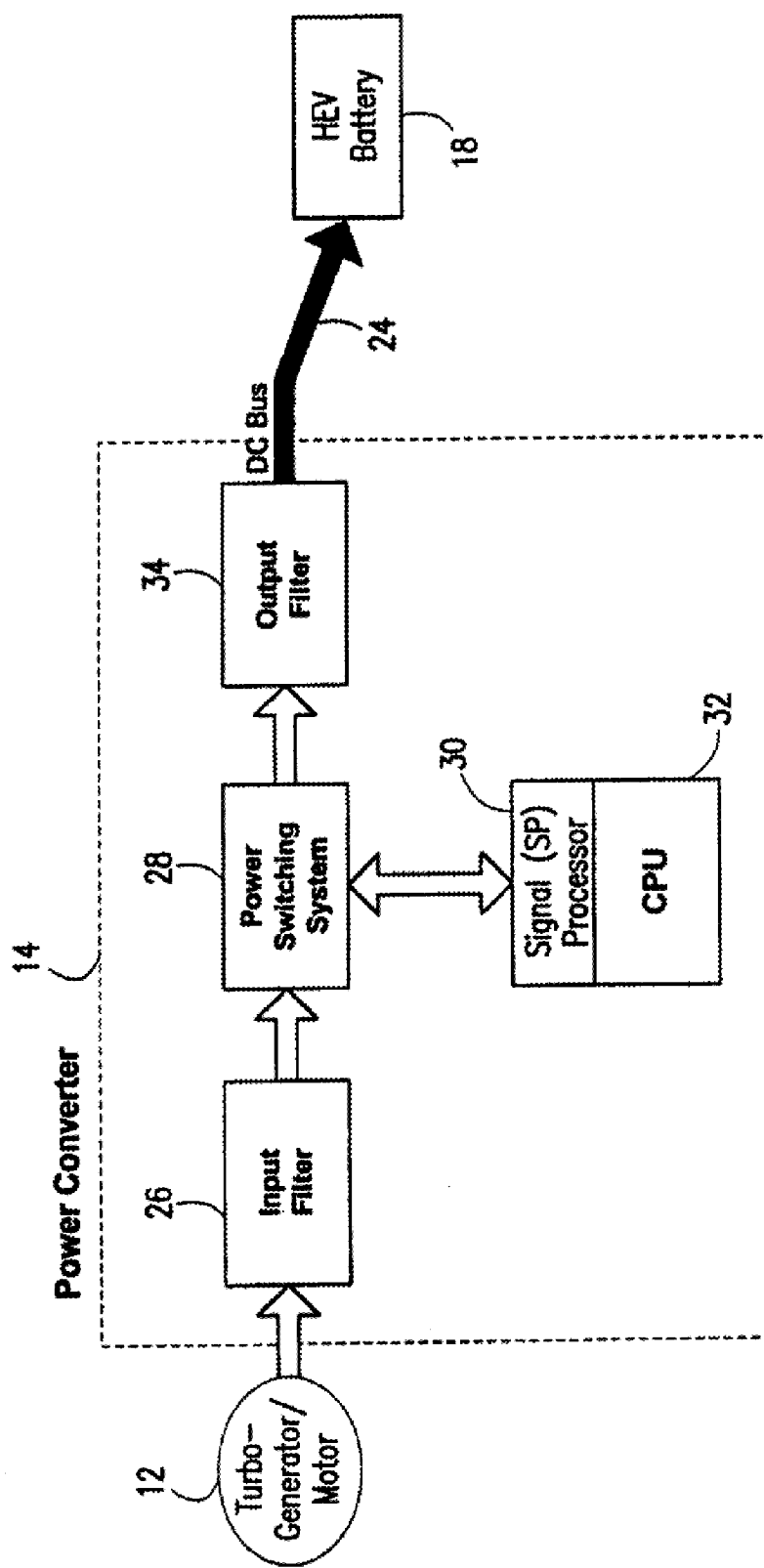
Figure 3:
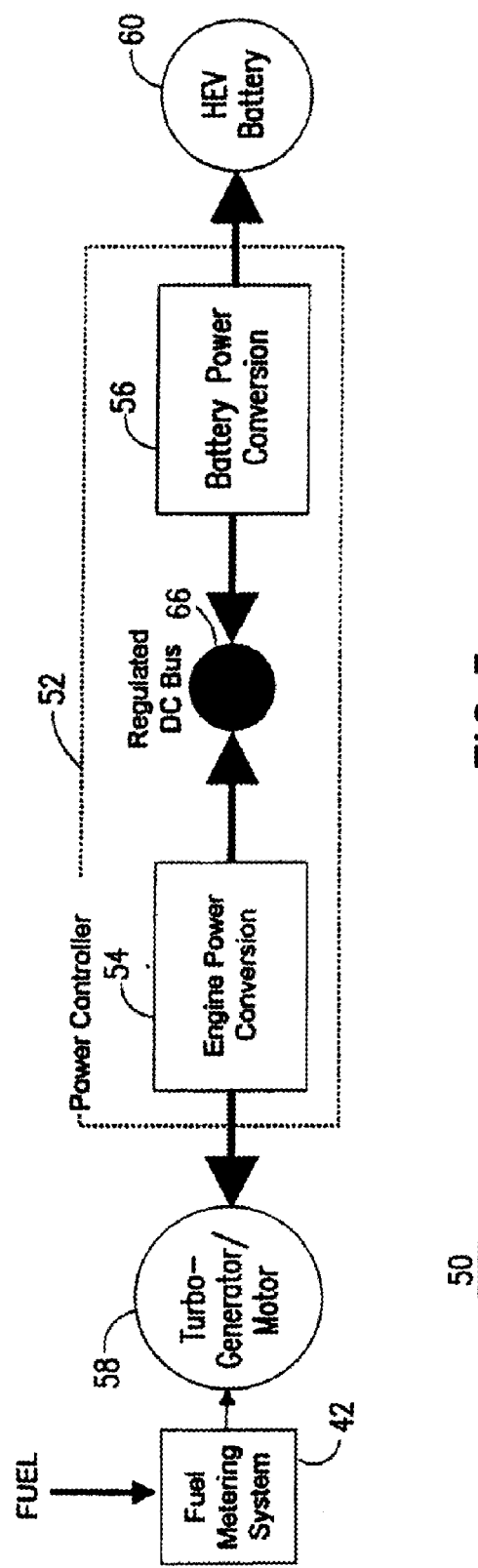
Figure 4:
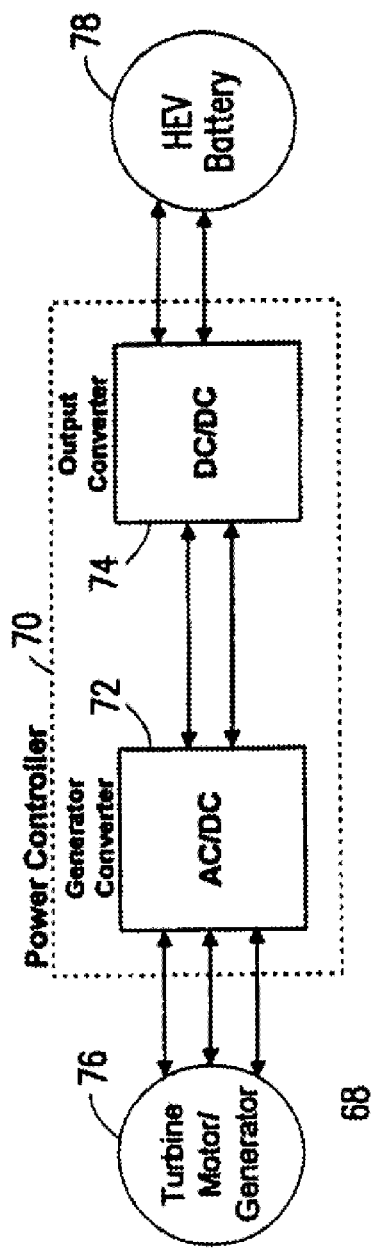
Figure 5:
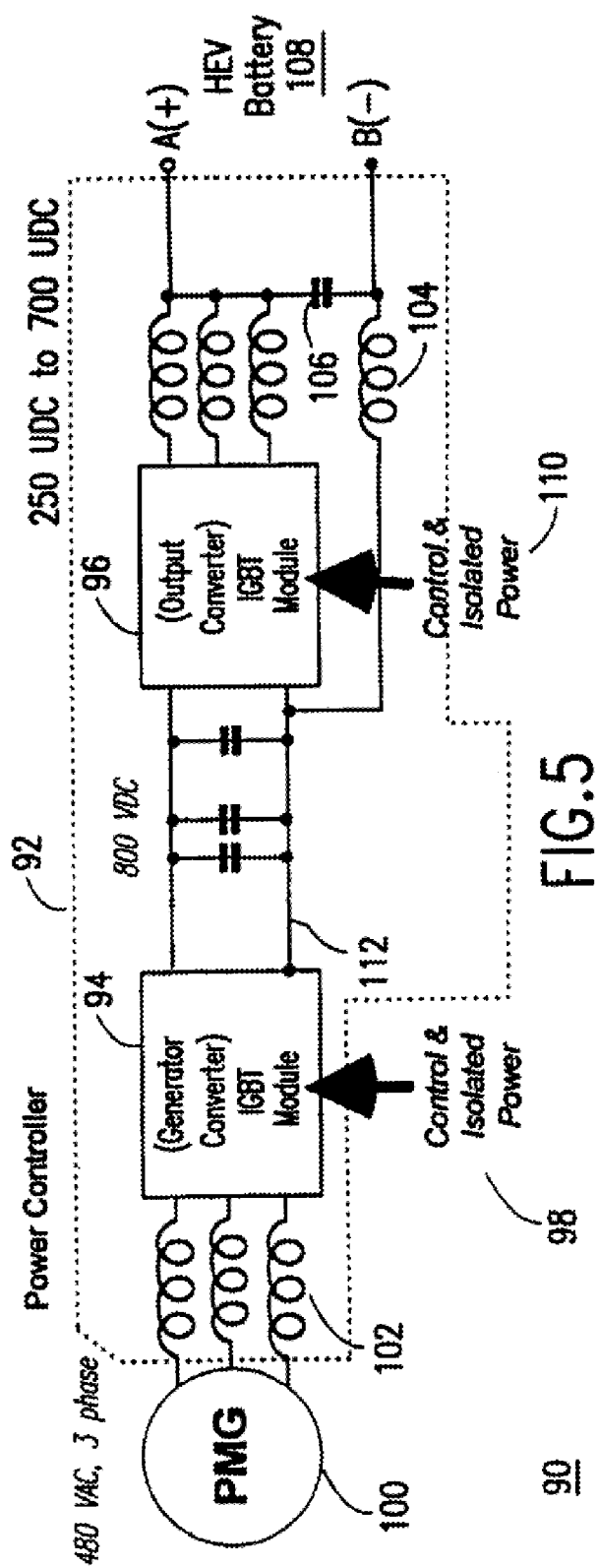
Figure 6:
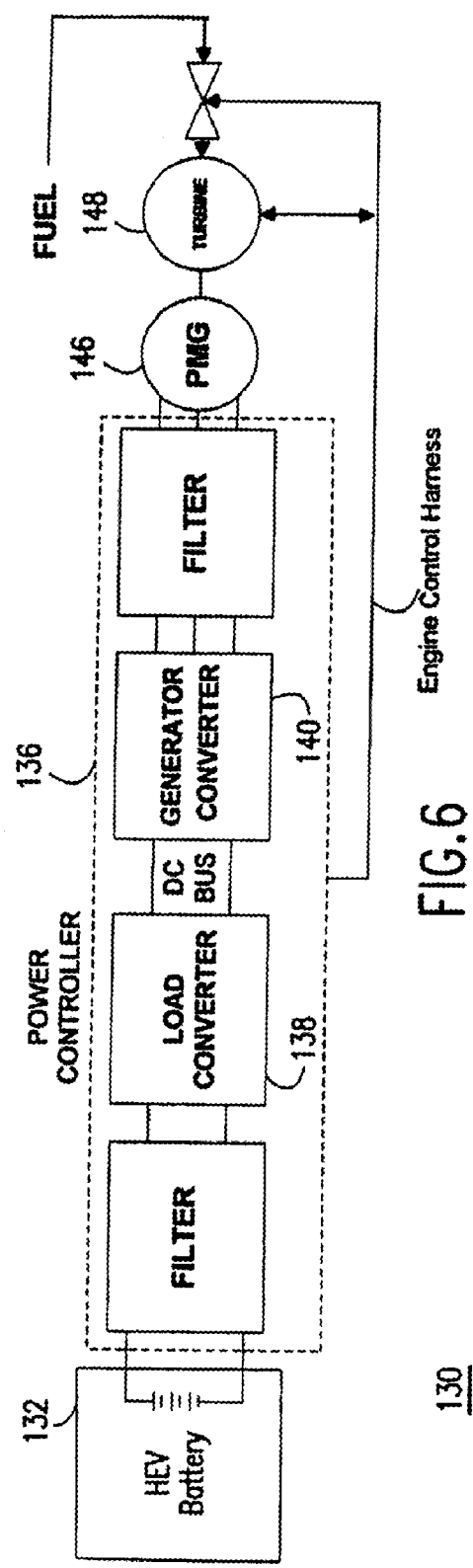
Figure 7:
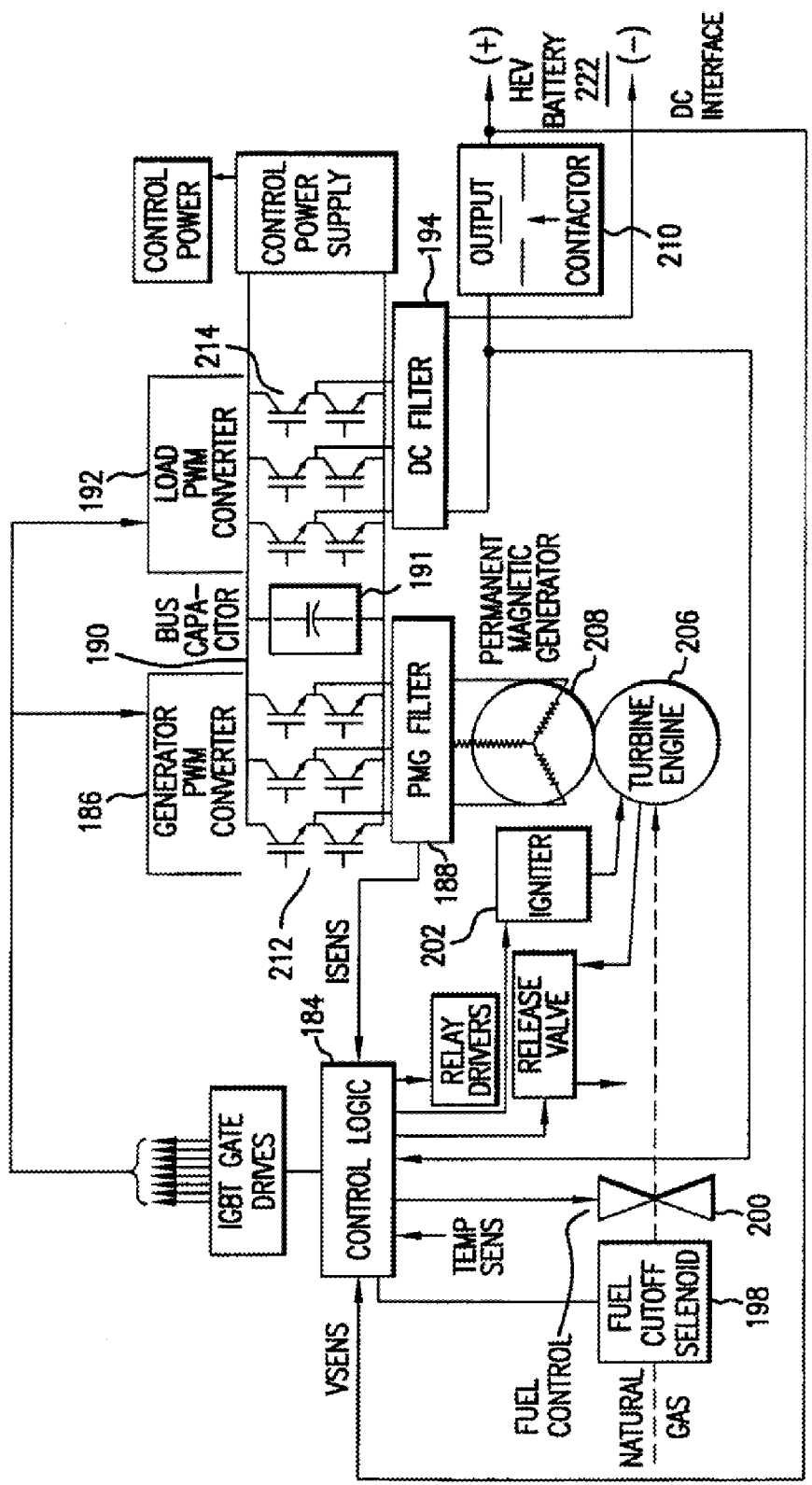
Figure 8:
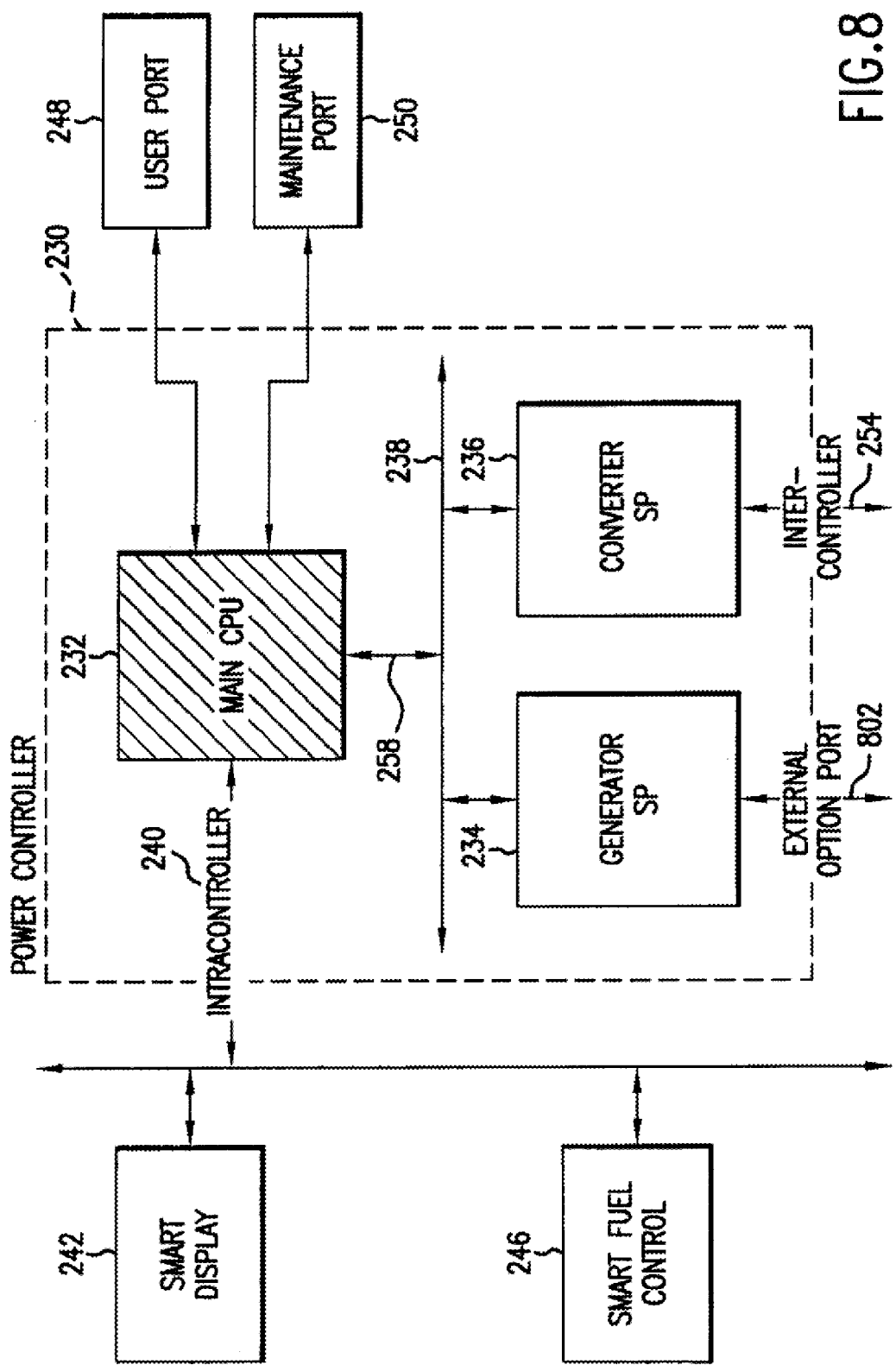
Figure 9:
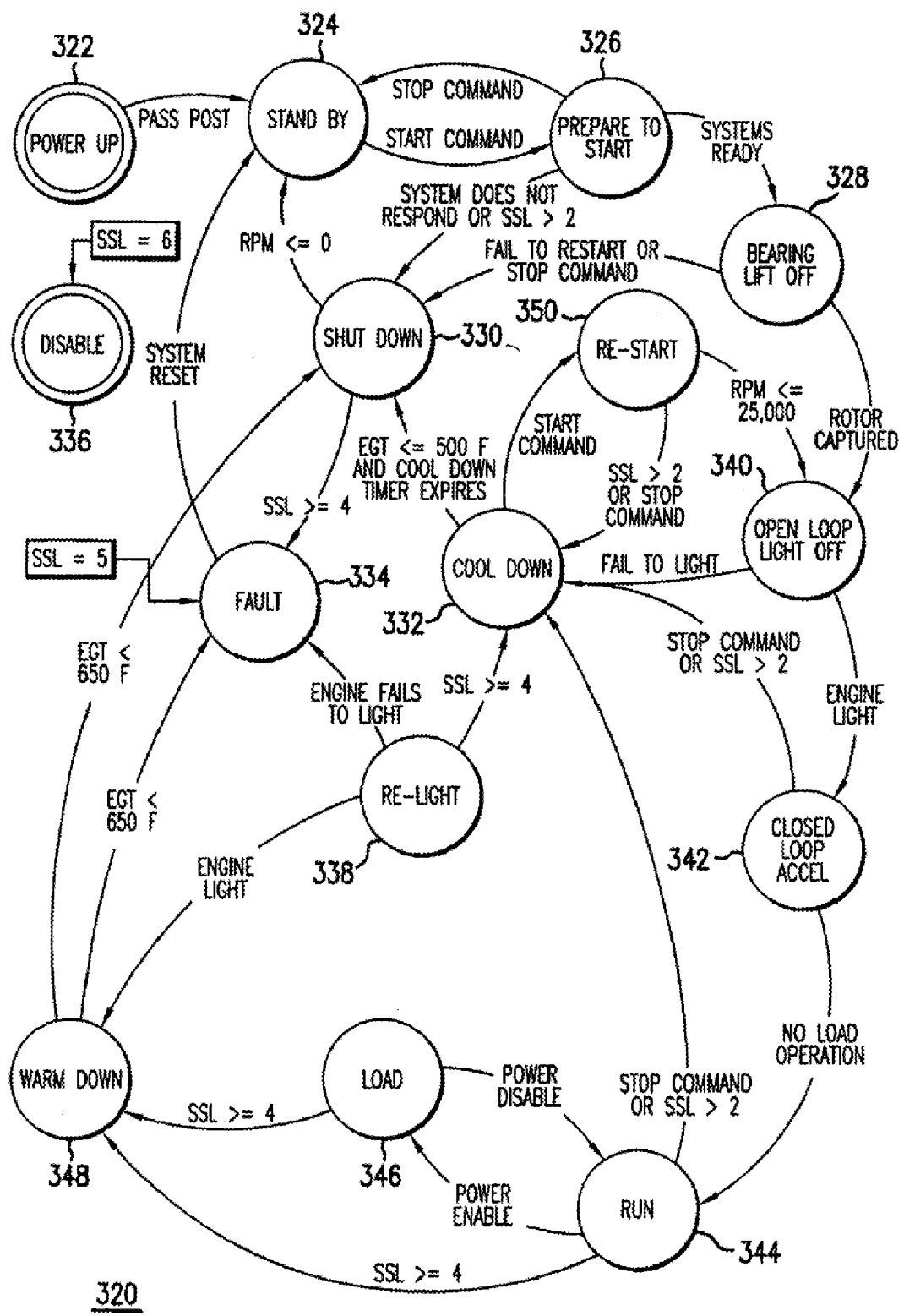
Figure 10:
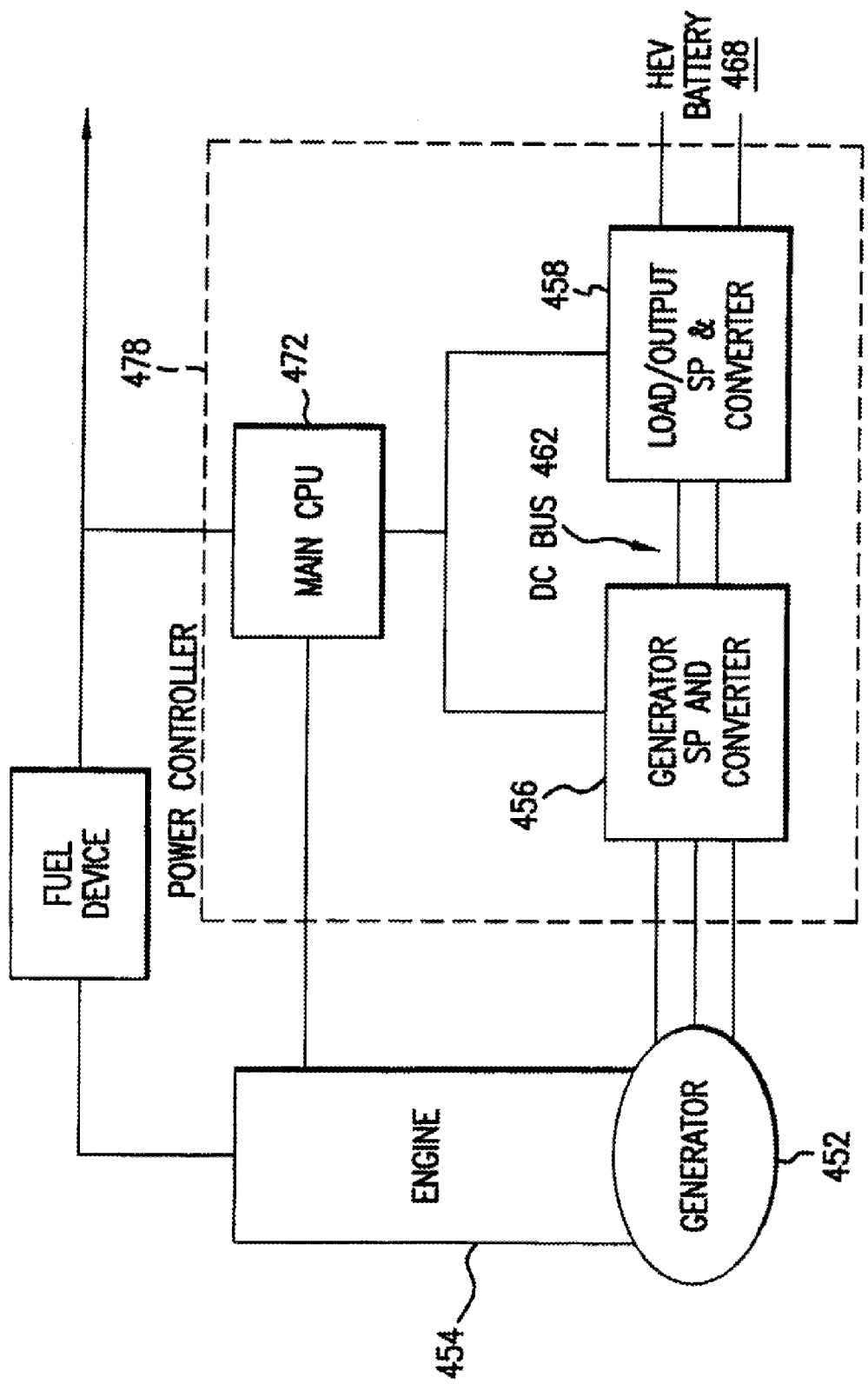
Figure 11:
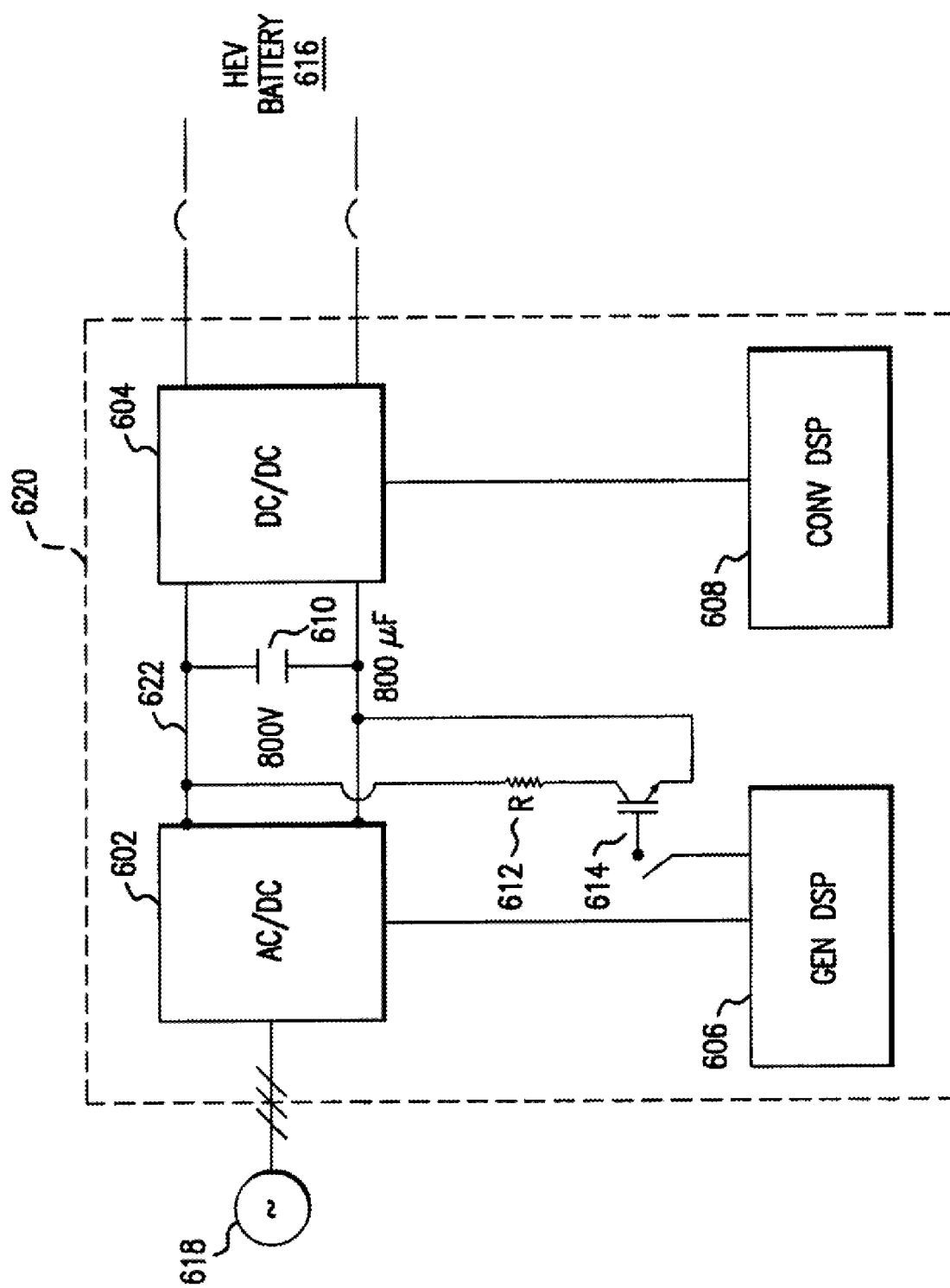

Having thus described the present invention in general terms, reference will now be made to the accompanying drawings in which:

FIG. 1 is a block diagram of a power controller according to the present invention;

FIG. 2 is a detailed block diagram of a power converter in the power controller illustrated in FIG. 1;

FIG. 3 is a simplified block diagram of a turbogenerator/motor system including the power architecture of the power controller illustrated in FIG. 1;

FIG. 4 is a block diagram of the power architecture of a typical implementation of the power controller illustrated in FIG. 1;

FIG. 5 is a schematic diagram of the internal power architecture of the power controller illustrated in FIG. 1;

FIG. 6 is a functional block diagram of an interface between the HEV battery and turbogenerator/motor using the power controller according to the present invention:

FIG. 7 is a schematic diagram of an interface between the HEV battery and turbogenerator/motor using the power controller according to the present invention;

FIG. 8 is a block diagram of the software architecture for the power controller including external interfaces;

FIG. 9 is a state diagram showing various operating states of the power controller;

FIG. 10 is a block diagram of the power controller interfacing with a turbogenerator/motor and fuel device; and FIG. 11 is a diagram of the power controller shown in FIG. 10 and including a brake resistor.

DETAILED DESCRIPTION OF THE PREFERRED EMBODIMENTS

FIG. 1 illustrates the power controller 10 which provides a distributed generation power networking system in which bi-directional (i.e. reconfigurable) power converters 14, 16 are utilized with a common DC bus 24 for permitting compatibility between the energy components, namely turbine motor/generator (turbogenerator/motor) and the HEV battery 18. Each power converter 14, 16 operates essentially as a customized bi-directional switching converter configured, under the control of power controller 10, to provide an interface of each energy component to the DC bus 24. Power controller 10 controls the way in which each energy component 12, 18, at any moment, will sink or source power and the manner in which DC bus 24 is regulated. In this way, either the turbogenerator/motor 12 or the HEV battery 18 can be used to supply, store, and/or use power in an efficient manner.

The application of the turbogenerator/motor and associated control electronics to the hybrid electric vehicle overcomes the disadvantages of the reciprocating engine. The turbogenerator/motor power plant is vibration free, has low noise and most significantly has an extremely low level of polluting emissions. The turbogenerator/motor power plant can operate with all conventional hydrocarbon fuels and properly controlled can produce an output voltage independent of turbogenerator/motor speed.

The on-board energy storage devices, such as traction batteries, provide peak power requirements and absorb regenerative braking energy from the vehicle. The turbogenerator/motor performs as a current source providing average energy power and can be started using energy from the on-board energy storage device.

One skilled in the art will recognize that the particular configurations shown herein are for illustration purposes only. In particular, the present invention is not limited to the use of a turbogenerator/motor and a HEV battery as shown in FIG. 1. Rather, the turbogenerator/motor may be a gas turbine, photovoltaics, or any other conventional or newly developed energy source. Likewise the HEV battery may be a flywheel, ultracapacitor or any other conventional or newly developed energy storage device on a HEV.

Referring now to FIG. 2, a detailed block diagram of power converter 14 in power controller 10, shown in FIG. 1, is illustrated. Turbogenerator/motor 12 is connected to DC bus 24 via power converter 14 and produces AC voltage which is applied to power converter 14. Power converter 14 includes an input filter 26, power switching system 28, output filter 34, signal processor 30 and main CPU 32.

In operation, turbogenerator/motor 12 applies AC to input filter 26 in power converter 14. The filtered AC is then applied to power switching system 28 which may conveniently be a series of insulated gate bipolar transistor (IGBT) switches operating under the control of signal processor (SP) 30 which is controlled by main CPU 32. One skilled in the art will recognize that other conventional or newly developed switches may be utilized as well. The output of the power switching system 28 is applied to output filter 34 which applies the filtered DC to DC bus 24 which in turn is connected in similar fashion to HEV battery 18 via power converter 16.

In accordance with the present invention, each power converter 14, 16 operates essentially as a customized, bi-directional switching converter under the control of main CPU 32, which uses SP 30 to perform its operations. Main CPU 32 provides both local control and sufficient intelligence to form a distributed processing system. In FIG. 1, each power converter 14, 16 is tailored to provide an interface for each specific energy component 12, 18 to DC bus 24. Main CPU 32 controls the way in which each energy component 12, 18 sinks or sources power, and DC bus 24 is regulated at any time. In particular, main CPU 32 reconfigures the power converters 14, 16 into different configurations for different modes of operation. In this way, various energy components 12, 18 can be used to supply, store, and/or use power in an efficient manner. Without the present invention, a turbogenerator/motor 12 regulates engine speed to control the output of bus voltage while with the power controller 10 of the present invention, the bi-directional converters regulate the bus voltage independent of turbogenerator/motor speed.

FIG. 1 shows the system topography in which DC bus 24, regulated at 800 VDC for example, is at the center of an energy exchange network on an HEV. In general, turbogenerator/motor 12 provides power to DC bus 24 via power converter 14 during normal power generation mode. Similarly, during the power generation mode, power converter 16 converts the power on the DC bus 24 to the form required by the HEV battery 18. During other modes of operation, such as turbogenerator/motor starting, power converters 14, 16 are controlled by the main CPU 32 to operate in different manners.

For example, energy is needed to start the turbogenerator/motor 12 and this energy would normally come from the HEV battery 18. During battery start, power converter 16 is required to apply power from HEV battery 18 to DC bus 24 for conversion by power converter 14 into the power required by turbogenerator/motor 12 for startup. During battery start, turbogenerator/motor 12 is controlled in a local feedback loop to maintain the turbogenerator/motor revolutions per minute (rpm).

FIG. 3 illustrates a simplified block diagram of a turbogenerator/motor system 50 using the power controller electronics architecture of the present invention. The turbogenerator/motor system 50 includes a fuel metering system 42, turbogenerator/motor 58, power controller 52, and HEV battery 60. The fuel metering system 42 is matched to the available fuel and pressure. The power controller 52 converts the electricity from turbogenerator/motor 58 into regulated DC then converts it to battery grade DC electricity. By separating the engine control from the converter (double conversion) that creates the battery grade power and greater control of both processes is realized. All of the interconnections are comprised of a communications bus and a power connection.

The power controller 52 includes an engine power conversion 54 and battery power conversion 56 which provides for the two power conversions that take place between turbogenerator/motor 58 and HEV battery 60. One skilled in the art will recognize that the power controller 52 can provide a double conversion DC power system with as few as two power converters. The bi-directional power converters 54, 56 are used with a common regulated DC bus 66 for permitting compatibility between turbogenerator/motor 58 and HEV battery 60. Each power converter 54, 56 operates essentially as a customized bi-directional switching converter configured, under control of the power controller 10, to provide an interface for a specific energy component 58, 60 to DC bus 66. The power controller 10 controls the way in which each energy component, at any moment, will sink or source power, and the manner in which the DC bus 66 is regulated. Both of these power converters 54, 56 are capable of operating in a forward or reverse direction. This allows starting the turbogenerator/motor 58 from the HEV battery 60. The regulated DC bus 66 allows a standardized interface with a wide range of DC sources such as batteries, flywheels and ultracapacitors.

Referring to FIG. 4, the power architecture 68 of a typical implementation of the power controller 70 is shown. The power controller 70 includes a generator converter 72 and an output converter 74 which provides for the two power conversions that take place between turbogenerator/motor 76 and the HEV battery 78. In particular, during generation mode, the generator converter 72 provides for AC to DC power conversion and the output converter 74 provides for DC to DC power conversion. Both of these converters 72, 74 are capable of operating in a forward or reverse direction.

A schematic 90 of a typical internal power architecture, such as shown in FIG. 4, is illustrated in FIG. 5. In this case, the turbogenerator/motor is a permanent magnet generator/motor (PMG) 100 that can be used either as a motor (for starting) or as a generator (normal mode of operation). Since all of the controls can be performed in the digital domain and all switching (except for one output contactor) is done with solid state switches, it is easy to shift the direction of the power flow as needed. This permits very tight control of the turbogenerator/motor during starting and stopping. In a typical configuration, the power output is 300 VDC while the present invention can be adapted to provide other power output requirements ranging from 250 VDC to 700 VDC.

Power controller 92 includes generator converter (IGBT Module) 94 and output converter (IGBT Module) 96. Generator converter 94 includes IGBT switches, such as a seven-pack IGBT module, driven by control logic 98, providing a variable voltage, variable frequency three-phase drive to the permanent magnet turbogenerator/motor 100. Inductors 102 are utilized to minimize any current surges associated with the high frequency switching components which may affect the permanent magnet turbogenerator/motor 100 to increase operating efficiency.

IGBT module 94 is part of the electronics that controls the turbogenerator/motor and incorporates gate driver and fault sensing circuitry as well as a seventh IGBT used to dump power into a resistor as will be shown later. The gate drive inputs and fault outputs require external isolation. Four external, isolated power supplies are required to power the internal gate drives. IGBT module 94 is typically used in a turbogenerator/motor that generates 480 VAC at its output terminals delivering up to 30 kWatts to the HEV battery. During startup and cool down (and occasionally during normal operation), the direction of power flow through the seven-pack reverses. When the turbogenerator/motor is being started, power is supplied to the DC bus 112 from the HEV battery 108 and the DC is converted to a variable frequency AC voltage to motor the turbogenerator/motor.

For HEV battery operation, control logic 110 sequentially drives the solid state IGBT switches, typically configured in a six-pack IGBT module 96, associated with load or output converter 96 to boost the voltage to provide start power to the generator converter 94. The IGBT switches in load converter 96 are preferably operated in a high (15 kHz) frequency, and modulated in a pulse width modulation manner to provide four quadrant converter operation. Inductors 104 and DC filter capacitors 106 are utilized to minimize any current surges associated with the high frequency switching components which may affect the HEV battery 108.

Six-pack IGBT module 96 is part of the electronics that controls the converter of the HEV battery 108 and incorporates gate driver and fault sensing circuitry which requires external isolation. Four external, isolated power supplies are required to power the internal gate drivers. IGBT module 96 is typically used in a turbogenerator/motor system that generates 300 VDC at is output terminals delivering up to approximately 30 kWatts to an HEV battery 108. After the turbogenerator/motor is running, six-pack IGBT module 96 is used to convert the regulated DC bus voltage to the approximately 300 DC HEV battery grade power. During turbogenerator/motor starting and cool down, the energy to run the turbogenerator/motor 100 comes from the HEV battery 108. Under this condition, the direction of power flow through the six-pack IGBT module reverses and the DC bus 112 receives its energy from HEV battery 108, using six-pack IGBT module 96 as a boost converter (the power diodes act as a rectifier). The DC is converted to a variable frequency AC voltage in generator converter 94 to motor the turbogenerator/motor 100. In order to accelerate the turbogenerator/motor 100 as rapidly as possible at first, current flows at the maximum rate through both six-pack IGBT module 94 and also six-pack IGBT module 96.

As stated previously, energy is needed to start the turbogenerator/motor and this energy can come from the HEV battery. When the HEV battery 60 supplies this energy, the HEV battery 60 is connected to power controller 52 through two circuits. First is an output contactor that handles the full power (30 kWatts) and the second is a "soft start" or "pre-charge" circuit that supplies limited power (it is current limited to prevent very large surge currents) from HEV battery 60 to DC bus 66 through a simple rectifier. The amount of power supplied trough the soft-start circuit is enough to start the housekeeping power supply, power the control board, and run the power supplies for the IGBTs, and close the output contactor. When the contactor closes, the IGBTs are configured to boost the DC from the HEV battery. Enough power is created to run the fuel metering circuit 42, start the turbogenerator/motor 58, and close the various solenoids (including the dump valve on the engine).

In FIG. 6, a functional block diagram 130 of an interface between HEV battery 132 and permanent magnet turbogenerator/motor, (consisting of permanent magnet generator/motor 146 and turbine 148) using power controller 136 of the present invention is shown. In this example, power controller 136 includes two bi-directional converters, a load converter 138 and a generator converter 140. Permanent magnet turbogenerator/motor converter 140 starts the permanent magnet turbogenerator/motor 146, 148 (using the generator as a motor) with HEV battery power. Load converter 138 then produces DC power using an output from generator converter 140 to draw power from high-speed generator/motor 146. Power controller 136 also regulates fuel to turbine 148 and provides communication to external entities. During a HEV battery sequence, HEV battery 132 supplies starting power to permanent magnet turbogenerator/motor 146, 148 by actively boosting the battery voltage via load converter 138, and then converting the boosted DC to variable voltage, variable frequency three-phase power on generator converter 140.

Referring to FIG. 7, a schematic illustration 180 of an interface between HEV battery 222 and turbogenerator/motor 206, 208 using the power controller is illustrated. Control logic 184 also provides power to fuel cutoff solenoids 198, fuel control valve 200, and igniter 202. In accordance with an alternative embodiment of the invention, a fuel system (not shown) involving a compressor (not shown) operated from a separate variable speed drive can also derive it power directly from DC bus 190.

In operation, control and start power comes from HEV battery 222 which is connected via an inrush limiting mechanism to slowly charge internal bus capacitor 191. For HEV battery operation, control logic 184 sequentially drives solid state IGBT switches 214 associated with load converter 192 to boost the HEV battery voltage to provide start power to generator converter 186. Switches 214 are preferably operated at a high (15 kHz) frequency, and modulated in a pulse width modulation manner to provide four quadrant converter operation. In accordance with the present invention, load converter 192 either sources power from DC bus 190 to HEV battery 222 or from HEV battery 222 to DC bus 190. A current regulator (not shown) may achieve this control.

Solid state (IGBT) switches 212 associated with generator converter 186 are also driven from control logic 184, providing a variable voltage, variable frequency three-phase drive to generator 208 to start the turbine 206. Control logic 184 receives feedback via current sensors $I_{sens}$ as turbine 206 is ramped up in speed to complete the start sequence. When turbine 206 achieves a self-sustaining speed of, for example, approximately 40,000 rpm, generator converter 186 changes its mode of operation to boost the generator output voltage and provide a regulated DC bus voltage.

PMG filter 188 associated with generator converter 186 includes three inductors to remove the high frequency switching component from permanent magnet generator 208 to increase operating efficiency. Output DC filter 194 associated with load converter 192 includes three inductors (not shown) and DC filter capacitors (not shown) to remove the high frequency component. Output contactor 210 disengages load converter 192 in the event of a unit fault.

During a start sequence, control logic 184 opens fuel cutoff solenoid 198 and maintains it open until the system is commanded off. Fuel control 200 may be a variable flow valve providing a dynamic regulating range, allowing minimum fuel during start and maximum fuel at fuel load. A variety of fuel controllers, including but not limited to, liquid and gas fuel controllers, may be utilized. One skilled in the art will recognize that the fuel control can be by various configurations, including but not limited to a single or dual stage gas compressor accepting fuel pressures as low as approximately ¼ psig. Igniter 202, a spark type device similar to a spark plug for an internal combustion engine, is operated only during the start sequence.

For HEV battery operation, the HEV battery power is used for starting as described above. When turbine 206 has reached a desired operating speed, converter 192 is operated as a DC to DC converter and essentially operates as a current source converter sourcing current into the HEV battery 222. If HEV battery collapses, the loss of HEV battery 222 is sensed and the unit output goes to zero and disconnects. The unit can receive external control signals to control the desired output power, such as to offset the power drawn by the HEV propulsion motor.

Referring to FIG. 8, power controller 230 includes main CPU 232, generator SP 234, and converter SP 236. Main CPU software program sequences events which occur inside power controller 230 and arbitrates communications to externally connected devices. Main CPU 232 is preferably a MC68332 microprocessor, available from Motorola Semiconductors, Inc. of Phoenix, Ariz., while other suitable commercially available microprocessors may be used as well. The software performs the algorithms that control engine operation, determine power output and detect system faults.

Commanded operating modes are used to determine how power is switched through the major converters in the controller. The software is responsible for turbine engine control and issuing commands to other SP processors enabling them to perform the generator converter and output converter switching.

Generator SP 234 and converter SP 236 are connected to power controller 230 via serial peripheral interface (SPI) bus 238 to perform generator and converter control functions. Generator SP 234 is responsible for any switching which occurs between DC bus 258 and the output to generator. Converter SP 236 is responsible for any switching which occurs between DC bus 258 and output to load. As previously indicated, generator SP 234 and converter SP 236 operate IGBT modules.

Local devices, such as a smart display 242, and smart fuel control 246 are connected to main CPU in power controller 230 via intracontroller bus 240, which may be a RS485 communication link. Smart display 242 and smart fuel control 246 perform dedicated controller functions, including but not limited to display, energy storage management, and fuel control functions.

Main CPU 232 in power controller 230 is coupled to user port 248 for connection to a computer, workstation, modem or other data terminal equipment which allows for data acquisition and/or remote control. User port 248 may be implemented using a RS232 interface or other compatible interface. Main CPU 232 is also coupled to maintenance port 250 for connection to a computer, workstation, modem or other data terminal equipment which allows for remote development, trouble shooting and field upgrades. An RS232 interface can also be used to implement maintenance port 250.

The main CPU processor software communicates data through a TCP/IP stack over intercontroller bus, typically an Ethenet-10 Base-2 interface, to gather data and send commands between power controllers. In accordance with the present invention, the main CPU processor software provides seamless operation of multiple paralleled units as a single larger generator system. One unit, the master, arbitrates the bus and sends commands to all units.

Intercontroller bus 254, which may be a RS485 communications link, provides high-speed synchronization of power output signal directly between converter SPs such as converter SP 236. Although the main CPU software is not responsible for communicating on the intercontroller bus 254, it informs converter SPs, including converter SP 236, when main CPU is selected as the master.

External options port bus 802, which may also be a RS 485 communications link, allows external devices, including but not limited to power meter equipment and auto disconnect switches, to be connected to generator SP 234.

In operation, main CPU 232 begins execution with a power on self-test when power is applied to the control board. External devices are detected providing information to determine operating modes the system is configured to handle. Power controller 230 waits for a start command by making queries to external devices. Once received, power controller 230 sequences up to external smart devices 242 and 246 to assist with bringing power controller 230 online.

The main CPU software interfaces with several electronic circuits (not shown) on the control board to operate devices that are universal to all power controllers 230. Interface to system I/O begins with initialization of registers within power controller 230 to configure internal modes and select external pin control. Once initialized, the software has access to various circuits including discrete inputs/outputs, analog inputs/outputs, and communication ports. These external devices may also have registers within them that require initialization before the device is operational.

Main CPU 232 is responsible for all communication systems in power controller 230. Data transmission between a plurality of power controllers 230 is accomplished through intercontroller bus 254. Main CPU also provides control for external devices, including smart devices 242 and 246, which share information to operate. Data transmission to external devices, including smart display 242 and smart fuel control 246 devices, is accomplished through intracontroller bus 240. Main CPU 232 initializes any communications hardware attached to power controller 230 for intracontroller communications bus 240 and implements features for the bus master on intracontroller communications bus 240.

Communications with a user computer is accomplished through user interface port 248. Main CPU 232 initializes any communications hardware attached to power controller 230 for user interface port 248. In a typical configuration, at power up, the initial baud rate will be selected to 19,200 baud, 8 data bits, 1 stop, and no parity. The user has the ability to adjust and save the communications rate setting via user interface port 248 or optional smart external display 242. The saved communications rate is used the next time power controller 230 is powered on. Main CPU 232 communicates with a modem (not shown), such as a Hayes compatible modem, through user interface port 248. Once communications area established, main CPU 232 operates as if it were connected to a local computer and operates as a slave on user interface port 248 (it only responds to commands issued).

Communications to service engineers, maintenance centers, and so forth are accomplished through maintenance interface port 250. Main CPU 232 initializes the communications to any hardware attached to power controller 230 for maintenance interface port 250. In a typical implementation, at power up, the initial baud rate will be selected to 19,200 baud, 8 data bits, 1 stop, and no parity. The user has the ability to adjust and save the communications rate setting via user port 248 or optional smart external display 242. The saved communications rate setting is used the next time power controller is powered on. Main CPU 232 communicates with a modem, such as a Hayes compatible modem, through maintenance interface port 250. Once communications are established, main CPU 232 operates as if it were connected to a local computer and operates as a slave on maintenance port 250 (it only responds to commands issued).

As shown in FIG. 8, main CPU 232 orchestrates operation for motor, converter and engine controls for power controller 230. The main CPU 232 does not directly perform motor and converter controls. Rather, generator and converter SP processors 234, 236 perform the specific control algorithms on data communicated from main CPU 232.

Main CPU 232 issues commands via SPI communications bus 238 to generator SP 234 to execute the required motor control functions. Generator SP 234 will operate the motor (not shown) in either a DC bus voltage mode or a rpm mode as selected by main CPU 232. In the DC bus voltage mode, generator SP 234 uses power from the motor to maintain the DC bus at the setpoint. In the rpm mode, generator SP 234 uses power from the motor to maintain the engine speed at the setpoint. Main CPU 232 provides the setpoint values.

Main CPU 232 issues commands via SPI communications bus 238 to converter SP 236 to execute required converter control functions. Converter SP 236 will operate the converter (not shown) in a DC bus mode or output current mode, as selected by main CPU. In the DC bus voltage mode, converter SP 236 regulates the HEV battery power provided by power controller 230 to maintain the internal bus voltage at the setpoint. In the output current mode, the converter SP 236 uses power from the DC bus to provide commanded current out of the converter. DC bus 462 (see FIG. 10) supplies power for logic power, external components and system power output.

Various control loops can be used to regulate the turbogenerator/motor controls and may include exhaust gas temperature (EGT) control, speed control, and power control. Each of these control loops can be used individually and collectively by main CPU 232 to provide the dynamic control and performance required of power controller 230. These loops are joined together for different modes of operation. A detailed description of such control loops can be found in U.S. patent application Ser. No. 207,817 filed Dec. 8, 1998 by Mark G. Gilbreth, Joel B. Wacknov, and Simon R. Wall, entitled "Power Controller", assigned to the same assignee as this application and hereby incorporated by reference in this application.

FIG. 9 shows a state diagram 320 with various operating states of power controller 478 of FIG. 10. Sequencing the system through the entire operating procedure requires power controller 478 to transition through a number of operating states.

Main CPU 472 begins execution in the "power up" state 322 after power is applied. Transition to the "stand by" state 324 is performed upon successful completing of the tasks of the "power up" state 322. Initiating a start cycle transitions the system to the "prepare to start" state 326 where all system components are initialized for an engine start. The engine then sequences through start states and onto the "run/load" states 344, 346. To shutdown the system, a stop command which sends the system into either "warm down" or "cool down" state 332, 348 is initiated. When the system has finally completed "warm down" or "cool down" process, a transition through the "shut down" state 330 will be made before the system reenters the "standby" state 324 awaiting the next cycle. During any state, detection of a fault with a system severity level indicating the system should not be operated will transition the system state to "fault" state 334. Detection of faults that indicate a processor failure has occurred will transition the system to the "disable" state 336.

One skilled in the art will recognize that in order to accommodate each mode of operation, the state diagram is multidimensional to provide a unique state for each operating mode. For example, in the "prepare to start" state 326, control requirements will vary depending on the selected operating mode. Each combination is known as a system configuration (SYSCON) sequence. Main CPU identifies each of the different system configuration sequences in a 16-bit word known as a SYSCON word, which is a bit-wise construction of an operating mode and system state number.

Separate "power up" 322, "re-light" 338, "warm down" 348, "fault" 334, and "disable" 336 states are not required for each mode of operation since the contents of these states are mode independent.

Operation of the system begins in the "power up" state 322 once application of power activates main CPU 472. Once power is applied to power controller 478, all the hardware components will be automatically reset by hardware circuitry. Main CPU 472 is responsible for ensuring the hardware is functioning correctly and configure the components for operation. Main CPU 472 also initializes its own internal data structures and begins execution by starting the Real-Time Operating System (RTOS). Successful completion of these tasks directs transition of the software to the "stand by" state 324.

Main CPU 472 continues to perform normal system monitoring in the "stand by" state 324 while it waits for a start command signal and commands HEV battery 468 to provide continuous power supply. In operation, main CPU 472 will often be left powered on waiting to start or for trouble shooting purposes. While main CPU 472 is powered up, the software continues to monitor the system and perform diagnostics is case any failures should occur. All communications will continue to operate providing interface to external sources.

A start command will transition the system to the "prepare to start" state 326 where the main CPU prepares the control system components for the engine start process. Many external devices may require additional time for hardware initialization before the actual start can commence. The "prepare to start" state 326 provides those devices the necessary time to perform initialization and send acknowledgement to the main CPU 472 that the start process can begin.

Once all systems are ready to go, the software shall transition to the "bearing lift off" state 328. At this point, main CPU 472 commands generator SP 456 to motor the engine 454 from typically about 0 to 25,000 rpm to accomplish the bearing lift off procedure. A check is performed to ensure that the shaft is rotating before transition to the next state occurs.

Once the motor 454 reaches its lift off speed, the software commences and ensures combustion is occurring in the turbine. In a typical configuration, main CPU 472 commands generator SP 456 to motor the engine 454 to a dwell speed of about 25,000 rpm where execution of the "open loop light off" state 340 starts combustion. Main CPU 472 then verifies that the engine 454 has not met the "fail to light" criteria before transition to the "closed loop accel" state 342.

Main CPU 472 then sequences engine 454 through a combustion heating process to bring the engine 454 to a self-sustaining operating point. In a typical configuration, commands are provided to generator SP 456 commanding an increase in engine speed to about 45,000 rpm at a rate of about 4,000 rpm/second. Fuel controls are executed to provide combustion and engine heating. When engine 454 reaches "no load" (requires no electrical power to motor), the software transitions to "run" state 344.

Main CPU 472 continues operation of control algorithms to operate the engine at no load. While power may be produced from engine 454 for operating control electronics, no power is output from load converter 458. A power enables signal transitions the software into "load" state 346. A stop command transitions the system to begin shutdown procedures (may vary depending on operating mode).

Main CPU 472 continues operation of control algorithms to operate the engine at the desired load. Load commands are issued through communications ports, display or system loads. While a stop command transitions main CPU to begin shutdown procedures, a power disable signal can transition main CPU 472 back to "run" state 344.

"Cool down" state 332 provides the ability to cool the turbine after operation and a means of purging fuel from the combustor. After normal operation, software sequences the system into "cool down" state 332. In a typical configuration, engine 454 is motored to a cool down speed of about 45,000 rpm. Airflow continues to move through engine 454 preventing hot air from migrating to mechanical components in the cold section. This motoring process continues until the engine EGT falls below a cool down temperature of about 193° C. Cool down may be entered at much lower than the final cool down temperature when engine 454 fails to ignite. The engine's combustor requires purging of excess fuel which may remain. The software always operates the cool down cycle for a minimum purge time of 60 seconds. This purge time ensures any remaining fuel is evacuated from the combustor. Completion of this process transitions the system into the "shut down" state 330. For user convenience, the system does not require a completion of the "cool down" state 332 before being able to attempt a restart. Issuing a start command transitions the system into the "restart" state 350.

Engine 454 is configured from the "cool down" state 332 before engine 454 can be restated. In a typical configuration, the software lowers the engine speed to about 25,000 rpm at a rate of 4,000 rpm/second. Once the engine speed has reached this level, the software transitions the system into the "open loop light off" state 340 to perform the actual engine start.

During the "shut down" state 330, the engine rotor is brought to rest and system outputs are configured for idle operation. In a typical configuration, the software commands the rotor to rest by lowering the engine speed at a rate of 2,000 rpm/second or no load condition, whichever is faster. Once the speed reaches about 14,000 rpm, the generator SP 456 is commanded to reduce the shaft speed to about 0 rpm in less than 1 second.

When a system fault occurs where no power is provided from energy storage device 468, the software re-ignites combustion to perform a warm down. The generator SP 456 is configured to regulate voltage (power) for the internal DC bus. Fuel is added as defined in the open loop light off control algorithm to ensure combustion occurs. Detection of engine light will transition the system to "warm down" state 348.

Fuel is provided when no electric power is available to operate 454 at a no load condition to lower the operating temperature in "warm down" state 348. In a typical configuration, engine speed is operated at about 50,000 rpm by supplying fuel through the speed control algorithm. Engine temperatures less than about 343° C. causes the system to transition to "shut down" state 330.

In the "fault" state 334 the present invention disables all outputs placing the system in a safe configuration when faults that prohibit safe operation of the turbine system are present. Operation of system monitoring and communications will continue if the energy is available.

In the "disable" state 336 system also disables all outputs placing the system in a safe configuration when faults that prohibit safe operation of the turbine system are present. System monitoring and communications will most likely not continue.

In particular, referring to FIG. 11, power controller 620 includes brake resistor 612 connected across DC bus 622. Brake resistor 612 acts as a resistive load, absorbing energy when converter SP 608 is turned off. In operation, when converter SP 608 is turned off, power is no longer exchanged with HEV battery 616, but power is still being received form the turbogenerator/motor, which power is then absorbed by brake resistor 612. The present invention detects the DC voltage between generator and converter SPs 606 and 608 and when the voltage starts to rise, brake resistor 612 is turned on to allow it to absorb energy.

In a typical configuration, AC generator 618 produces three phases of AC at variable frequencies. AC/DC converter 602 under the control of generator SP 606 converts the AC to DC which is then applied to DC bus 622 (regulated for example at 800 VDC) which is supported by capacitor 610 (for example, at 800 microfarads with two milliseconds of energy storage). DC/DC converter 604, under control of converter SP 608, converts DC into 300 VDC and applies it to the HEV battery 616. In accordance with the present invention, current from DC bus 622 can be dissipated in brake resistor 612 via modulation of switch 614 operating under the control of generator SP 606. Switch 614 may be an IGBT switch, although one skilled in the art will recognize that other conventional or newly developed switches may be utilized as well.

Generator SP 606 controls switch 614 in accordance to the magnitude of the voltage on DC bus 622. The bus voltage of DC bus 622 is typically maintained by converter SP 608, which shuttles power in and out of HEV battery 616 to keep DC bus 622 regulated at, for example, 800 VDC. When converter SP 608 is turned off, it no longer is able to maintain the voltage of DC bus 622, so power coming to from the turbogenerator/motor causes bus voltage of DC bus 622 to rise quickly. The rise in voltage is detected by generator SP 606, which turns on brake resistor 612 and modulates it on and off until the bus voltage is restored to its desired voltage, for example 800 VDC. Converter SP 608 detects when the HEV battery 616 has returned to normal conditions and restarts the converter side of power controller 620. Brake resistor 612 is sized so that it can ride through the transient HEV battery disturbance and the time taken to restart converter.

All significant control functions are provided by the present invention, including:

Start and stop the turbogenerator/motor;

Control the output power to the power demanded;

User input power set point;

Provide voltage limit control;

Maintain the turbine exhaust temperature (TET) at an acceptable steady state temperature;

Provide fault protection; and

Fault and maintenance information.

Having described the invention in accordance with the requirements of the patent statutes, those skilled in this art will understand how to make changes and modifications in the present invention to meet their specific requirements or conditions. For example, the power controller, while described generally, may be implemented in an analog or digital configuration. In the preferred digital configuration, one skilled in the art will recognize that various terms utilized in the invention are generic to both analog and digital configuration of power controller. For example, converters referenced in the present application is a general term which includes inverter, signal processors referenced in the present application is a general term which includes digital processor, and so forth. Correspondingly, in a digital implementation of the present invention, inverters and digital signal processors would be utilized. Such changes and modifications may be made without departing from the scope and spirit of the inventions as set forth in the following claims.

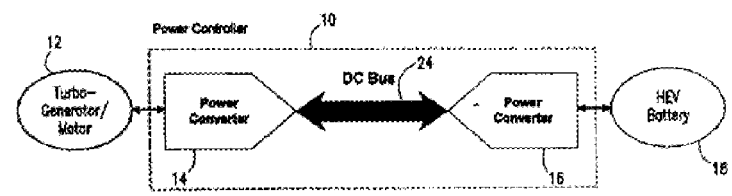

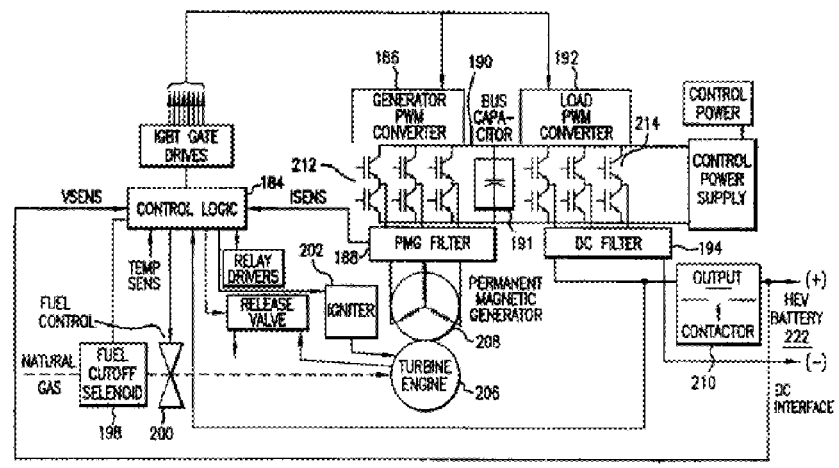

What we claim is:

1. A hybrid electric vehicle power generation system, comprising:

a turbo generator/motor;

a DC bus;

a first power converter connecting said turbogenerator/motor and said DC bus, said first power converter serving as an AC to DC convertor when power is supplied from said turbogenerator/motor to said DC bus and as a DC to AC convertor when power is supplied from said DC bus to said turbogenerator/motor;

an energy storage device;

a second power converter connecting said energy storage device and said DC bus, said second power converter transferring power between said DC bus and said energy storage device;

said first and second power converters together serving to regulate DC bus voltage to a desired voltage independent of turbogenerator/motor speed.

2. The system of claim 1 wherein said turbogenerator/motor includes a permanent magnet rotor.

3. The system of claim 1, further comprising:

a resistive load connected across said DC bus to dissipate power from said DC bus whenever DC bus voltage exceeds the desired voltage.

4. The system of claim 1 wherein said energy storage device is a battery.

5. The system of claim 1 wherein said energy storage device is a flywheel.

6. The system of claim 1 wherein said energy storage device is an ultracapacitor.

7. A hybrid electric vehicle power generation system, comprising:

a DC bus;

a permanent magnet turbogenerator/motor;

a battery;

a power controller that regulates DC bus voltage to a desired voltage independent of permanent magnet turbogenerator/motor speed, said power controller having a first power converter, connecting said permanent magnet turbogenerator/motor and said DC bus, that serves as an AC to DC convertor when power is supplied from said permanent magnet turbogenerator/motor to said DC bus and as a DC to AC convertor when power is supplied from said DC bus to said permanent magnet turbogenerator/motor, a second power converter, connecting said battery and said DC bus, that serves as a DC to DC converter when power is supplied from said DC bus to said battery and as a reverse DC to DC converter when power is supplied from said battery to said DC bus; and a resistive load connected across said DC bus to dissipate power from said DC bus whenever DC bus voltage exceeds the desired voltage.

* * * * *

UNITED STATES PATENT AND TRADEMARK OFFICE
CERTIFICATE OF CORRECTION

PATENT NO.      : 6,683,389 B2
APPLICATION NO. : 09/938101
DATED           : January 27, 2004
INVENTOR(S)     : Geis It is certified that error appears in the above-identified patent and that said Letters Patent is hereby corrected as shown below:

The title page showing the illustrative figure should be deleted to be replaced with the attached title page.

Drawing sheets, consisting of figs. 1-10, should be deleted to be replaced with the drawing sheets, consisting of figs. 1-10, as shown on the attached page.

Signed and Sealed this

Fifth Day of February, 2008

JON W. DUDAS
*Director of the United States Patent and Trademark Office*

(12) United States Patent
Geis

(10) Patent No.: US 6,683,389 B2
(45) Date of Patent: Jan. 27, 2004

(54) HYBRID ELECTRIC VEHICLE DC POWER GENERATION SYSTEM

(75) Inventor: Everett R. Geis, Orange, CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 0 days.

(21) Appl. No.: 09/938,101

(22) Filed: Aug. 23, 2001

(65) Prior Publication Data

US 2002/0070557 A1 Jun. 13, 2002

Related U.S. Application Data

(63) Continuation of application No. 09/609,099, filed on Jun. 30, 2000, now abandoned.

(51) Int. Cl.$^7$ .................................................. F02N 11/06
(52) U.S. Cl. ............................... 290/40 C; 180/65.2
(58) Field of Search ........................ 180/65.2; 322/16; 290/40 R

(56) References Cited

U.S. PATENT DOCUMENTS

| | | | | | |
|---|---|---|---|---|---|
| 5,568,023 A | * | 10/1996 | Grayer et al. | ............ | 180/165 |
| 5,698,905 A | * | 12/1997 | Ruthlein et al. | ............ | 180/65.4 |
| 5,806,617 A | * | 9/1998 | Yamaguchi | ............ | 180/65.2 |
| 5,848,659 A | * | 12/1998 | Karg et al. | ............ | 180/65.2 |
| 5,924,505 A | * | 7/1999 | Theurillat et al. | ............ | 180/65.4 |
| 5,965,991 A | * | 10/1999 | Kofke et al. | ............ | 318/139 |
| 5,969,624 A | * | 10/1999 | Sakai et al. | ............ | 180/65.2 |
| 6,137,250 A | * | 10/2000 | Hirano et al. | ............ | 180/65.2 |
| 6,175,172 B1 | * | 1/2001 | Bakholdin et al. | ............ | 310/74 |
| 6,194,794 B1 | * | 2/2001 | Lampe et al. | ............ | 307/68 |
| 6,213,234 B1 | * | 4/2001 | Rosen et al. | ............ | 180/65.3 |
| 6,281,601 B1 | * | 8/2001 | Edelman et al. | ............ | 307/29 |
| 6,487,096 B1 | * | 11/2002 | Gilbreth et al. | ............ | 363/35 |

FOREIGN PATENT DOCUMENTS

JP         11098728 A    *  4/1999

* cited by examiner

*Primary Examiner*—Nestor Ramirez
*Assistant Examiner*—Julio Cesar Gonzalez
(74) *Attorney, Agent, or Firm*—Sterne, Kessler, Goldstein & Fox P.L.L.C.

(57) ABSTRACT

A hybrid electric vehicle, such as a bus or delivery vehicle, includes batteries and a turbogenerator/motor connected through a double conversion control system. The batteries and the turbogenerator/motor are each connected to a DC bus through bi-directional power converters operating as customized bi-directional switching converters configured, under the control of a power controller, to provide an interface between the DC bus and the batteries and turbogenerator/motor, respectively.

7 Claims, 10 Drawing Sheets